(12) United States Patent
Tiainen et al.

(10) Patent No.: US 12,269,237 B2
(45) Date of Patent: Apr. 8, 2025

(54) LINERLESS LABEL

(71) Applicant: UPM Raflatac Oy, Tampere (FI)

(72) Inventors: Marko Tiainen, Jyväskylä (FI);
Magdalena Rabska, Tyniec Mały Kobierzyce (PL); Agnieszka Morawiec, Wrocław (PL)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 17/485,747

(22) Filed: Sep. 27, 2021

(65) Prior Publication Data
US 2022/0097337 A1 Mar. 31, 2022

(30) Foreign Application Priority Data
Sep. 29, 2020 (EP) .................................. 20198915

(51) Int. Cl.
*B31D 1/02* (2006.01)
*B05D 5/10* (2006.01)
(Continued)

(52) U.S. Cl.
CPC ............... *B31D 1/021* (2013.01); *B05D 5/10* (2013.01); *B32B 37/06* (2013.01); *C08K 5/54* (2013.01);
(Continued)

(58) Field of Classification Search
None
See application file for complete search history.

(56) References Cited

U.S. PATENT DOCUMENTS 4,889,234 A * 12/1989 Sorensen ............... B65D 5/708
428/41.9
5,154,974 A * 10/1992 Norman ................. C09J 133/06
428/355 R
(Continued)

FOREIGN PATENT DOCUMENTS

| WO | 9118739 A1 | 12/1991 |
| WO | 9315159 A1 | 8/1993 |

OTHER PUBLICATIONS

European Search Report for the corresponding European Application No. 20198915; Date of Mailing: Mar. 16, 2021; 7 pages.

*Primary Examiner* — Frank D Ducheneaux
(74) *Attorney, Agent, or Firm* — CANTOR COLBURN LLP

(57) ABSTRACT

This invention relates to a method for manufacturing a direct thermal linerless label web (100), the direct thermal linerless label web (100) comprising a face (110) having a first side (111) and a second side (112), the face comprising a direct thermal printable coating, wherein the method comprises supplying the face (110), and applying modified adhesive coating (121) on to a substrate (110, 611). The modified adhesive coating comprises water-based acrylic adhesive, and emulsified silicone additive. The method further comprises thermally drying the modified adhesive coating (121) on the substrate (110, 611) into a pressure sensitive adhesive coating (120). The substrate is the face (110) or a carrier material (611, 611a, 611b). This invention further relates to a direct thermal linerless label web (100), and a use of a direct thermal linerless label (100) in on-demand printing.

17 Claims, 11 Drawing Sheets

(51) Int. Cl.

| | |
|---|---|
| *B32B 37/06* | (2006.01) |
| *C08K 5/54* | (2006.01) |
| *C09J 7/38* | (2018.01) |
| *C09J 7/40* | (2018.01) |
| *C09J 133/06* | (2006.01) |
| *C09J 133/08* | (2006.01) |
| *C09J 183/04* | (2006.01) |
| *G09F 3/02* | (2006.01) |
| *G09F 3/10* | (2006.01) |

(52) U.S. Cl.
CPC ............... *C09J 7/385* (2018.01); *C09J 7/401* (2018.01); *C09J 133/06* (2013.01); *C09J 133/08* (2013.01); *C09J 183/04* (2013.01); *G09F 3/02* (2013.01); *G09F 3/10* (2013.01); *B32B 2307/7376* (2023.05); *C09J 2203/334* (2013.01); *C09J 2301/204* (2020.08); *C09J 2301/302* (2020.08); *C09J 2301/408* (2020.08); *C09J 2433/00* (2013.01); *G09F 2003/0225* (2013.01); *G09F 2003/0241* (2013.01)

(56) References Cited

U.S. PATENT DOCUMENTS

| | | |
|---|---|---|
| 5,840,657 A | 11/1998 | Mehta et al. |
| 8,338,516 B1* | 12/2012 | Parr .......................... C09J 11/08 |
| | | 524/270 |
| 8,846,182 B2* | 9/2014 | Kakihara ................. H01B 1/22 |
| | | 428/914 |
| 2009/0169282 A1 | 7/2009 | Keeton |
| 2015/0159054 A1 | 6/2015 | Wild et al. |
| 2021/0395965 A1* | 12/2021 | Araki ....................... E01F 9/512 |
| 2022/0073791 A1* | 3/2022 | Schönrock ................ C08L 9/02 |

* cited by examiner

LINERLESS LABEL

CROSS-REFERENCE TO RELATED APPLICATION

This application claims benefit of European Patent Application No. 20198915.9 filed on Sep. 29, 2020, the contents of which is incorporated by reference herein in its entirety.

TECHNICAL FIELD

This specification relates to a method for manufacturing a direct thermal linerless label comprising direct thermal printable coating and a pressure sensitive adhesive. This specification further relates to a direct thermal linerless label comprising direct thermal printable coating and a pressure sensitive adhesive. This specification further relates to use of a direct thermal linerless label in on-demand printing.

BACKGROUND

Linerless labels having direct thermal face materials may be used for several purposes, such as for on-demand printing. However, conventional linerless labels are known to have caused problems when used with on-demand printers. These problems may arise from the pressure sensitive adhesive being exposed without protective release liner and thus causing sticky adhesive contamination onto the printer internal mechanisms. Further, traditionally, some pressure sensitive adhesives have been difficult to use in linerless labels which comprise direct thermal face materials. There are limits for the highest temperatures that the direct thermal face materials can be exposed during label manufacturing in order to prevent unwanted and premature color changes of the thermally sensitive coating. Thus, for example, a lower adhesive coat weight has been used in attempts to overcome the problem by allowing drying/curing the adhesive in lower temperatures. However, lower coat weights and/or drying/curing in lower temperature may compromise the adhesive performance. Further, coating extremely thin layers of acrylic adhesives with high web speeds in a uniform manner without coating defects presents significant manufacturing challenges.

Thus, there is a need for an improved direct thermal linerless label product, and an improved method for manufacturing direct thermal label products.

SUMMARY

It is an aim of this specification to provide a method for manufacturing a direct thermal linerless label comprising pressure sensitive adhesive. Further, it is an aim of the specification to provide a direct thermal linerless label comprising pressure sensitive adhesive.

According to an embodiment, a method for manufacturing a direct thermal linerless label web comprising a modified adhesive coating comprising emulsified silicone additive is provided.

According to an embodiment, a method for manufacturing a direct thermal linerless label web comprising a patterned adhesive coating comprising emulsified silicone additive is provided.

In an embodiment, the method allows drying of the adhesive on a face or on a carrier material without causing unwanted and premature color changes to the thermally sensitive coating of the direct thermal linerless label web.

The direct thermal linerless label comprises a face having a first side and a second side. The first side of the face can be the top side of the face, and the second side of the face can be the bottom side of the face. Further, a first side of the direct thermal linerless label can be the top side of the linerless label, and a second side of the direct thermal linerless label can be the bottom side of the linerless label.

The face can comprise the direct thermal printable coating. Further, the direct thermal linerless label may comprise
 a release coating layer on the top of the direct thermally printable coating, and
 water-based acrylic PSA comprising silicone additive on the second side.

The direct thermal linerless label may consist of
 the face comprising the direct thermal printable coating,
 optionally, the release coating on the direct thermal printable coating, preferably comprising silicone, and
 an adhesive coating comprising water-based acrylic adhesive and silicone additive.

A method for manufacturing a direct thermal linerless label for on-demand printing can comprise the following steps:
 supplying the face comprising the direct thermal printable coating,
 applying modified adhesive coating on to a substrate, the modified adhesive coating comprising
 a) water-based acrylic adhesive,
 b) emulsified silicone additive, the amount of the emulsified silicone additive being in a range between 1 wt. % and 6 wt. %, preferably in a range between 2 wt. % and 4 wt. %, calculated from the total dry weight of the adhesive coating, and
 c) optionally, at least one wetting agent,
 and
 thermally drying the adhesive coating on the substrate into a pressure sensitive adhesive coating.

Said substrate may be the first side of the face or the second side of the face. Alternatively, the substrate may be the carrier material and the pressure sensitive adhesive coating may be transferred from the carrier material onto the first or second side of the face. After rolling the linerless label web into a roll, the PSA coating will become anchored to the second side (i.e., the bottom side) of the face material, no matter whether the adhesive coating was applied or transferred on the first side or the second side of the face.

In an embodiment, said adhesive coating is first applied on to a substrate, which is the face, and then thermally dried into the pressure sensitive adhesive coating on the face.

In another embodiment, said adhesive coating is applied on to a substrate, which is a carrier material, and then thermally dried into the pressure sensitive adhesive coating on the carrier material, after which the pressure sensitive adhesive is transferred from the carrier material onto the face.

Thus, said adhesive coating may be applied onto the second side of the face, or the pressure sensitive adhesive coating may be transferred from the carrier material onto the second side of the face.

Alternatively, the face may comprise the release coating on the first side of the face on the direct thermal printable coating, and said adhesive coating may be applied onto the first side of the face, or the pressure sensitive adhesive coating may be transferred from the carrier material onto the first side of the face. After rolling the direct thermal face into a roll, the pressure sensitive adhesive will become anchored to the second, i.e. bottom side of the face material. This embodiment may be particularly efficient manufacturing method, and the obtained product may have good properties for on-demand printing.

In this application, the terms "modified adhesive coating" and "adhesive coating" both refer to modified adhesive coatings, unless otherwise indicated.

The water-based acrylic adhesive coating may comprise:
butyl acrylate (BA), or
2-hydroxyethyl acrylate (2EHA), or
butyl acrylate (BA) and 2-hydroxyethyl acrylate (2EHA).

The total content of the butyl acrylate and/or 2-hydroxyethyl acrylate is preferably at least 20%, more preferably at least 45%, and most preferably at least 58%, calculated from the dry weight of the water-based acrylic adhesive. The water-based acrylic adhesive comprising butyl acrylate may be a permanent adhesive, while the adhesive comprising 2-hydroxyethyl acrylate without the butyl acrylate may be a removable adhesive.

The water-based acrylic adhesive may be a tackified acrylic adhesive. The tackified acrylic adhesive may be used to provide aggressive adhesion to a surface.

The adhesive coating may comprise at least one surface-active agent. The surface-active agents, in general, are compounds that lower the surface tension (or interfacial tension) between two liquids, between a gas and a liquid, or between a liquid and a solid.

In this application, at least one surface-active agent is preferably an emulsifier in order to obtain the emulsified silicone additive.

The adhesive coating may comprise two different surface-active agents. Advantageously, the two surface-active agents comprise an emulsifier and a wetting agent.

Thus, the adhesive coating may comprise
an emulsifier, and
a wetting agent.

In this application, the terms "emulsified silicone additive" and "silicone additive" both refer to emulsified silicone additive. The emulsified silicone additive typically comprises the silicone and the emulsifier for obtaining the emulsified silicone additive. The emulsifier may keep the silicone additive as a stable water dispersion.

The emulsified silicone additive may comprise
a silicone component, for example, a silicone oil (polydimethylsiloxane),
at least one emulsifier, and
water.

The wetting agent may be added into the adhesive coating to improve the coating process of the adhesive coating. The wetting agent may increase spreading and penetrating properties by lowering a surface tension.

The wetting agent may have a density in a range between 0.94 and 1.12 $g/cm^3$.

The adhesive coating may comprise wetting agents so that the total content of the wetting agent(s) may be in a range between 0 and 5 wt. %, more preferably at least 0.3 wt. %, and most preferably in a range between 0.4 wt. % and 3 wt. %, calculated from the total dry weight of the adhesive coating.

The person skilled in the art knows the wetting agents. In an embodiment, the wetting agent may comprise, for example, at least one of the following
Surfynol 3120 from Evonik,
Hydropalat 3120 from Basf, and
Lumiten ISO from Basf
However, these are only some examples of suitable wetting agents.

The method may further comprise the following step:
providing alternating adhesion areas and adhesion-free areas before the adhesive coating is dried into the pressure sensitive adhesive coating, In an embodiment, the adhesive coating is applied locally onto the face or onto the carrier to provide the face with alternating adhesion areas and adhesion-free areas.

Further, said adhesive coating may be applied on the substrate, preferably on the face, and most preferably on the second side of the face, and the method may further comprise:
providing moisture to the adhesion-free areas of the face prior to drying of the adhesive coating.

The moisture may be provided e.g. by spraying water on the adhesion-free areas of the second side of the face.

Alternatively, or in addition, the method may comprise the following step(s) to provide the adhesion-free areas:
applying adhesive coating on the substrate (i.e., the face or the carrier material),
removing at least 10% of the adhesive coating from the substrate (i.e., the face or the carrier material) prior to drying to provide alternating adhesion areas and adhesion-free areas.

In this embodiment, the removing of the adhesive coating may be implemented by a wiping blade, wherein the blade is preferably arranged at a wiping angle of 75-85 degrees with respect to the surface of the substrate.

The adhesion-free areas may comprise a residual amount of the adhesive coating in a range of 0-5.0 $g/m^2$. In an embodiment, the adhesion-free areas may comprise a residual amount of the adhesive coating in a range between 0 and 0.5 $g/m^2$. In another embodiment, the adhesion-free areas may comprise a residual amount of the adhesive coating in a range between 0.5 $g/m^2$ and 5 $g/m^2$. In a preferred embodiment, the adhesion-free areas may comprise a residual amount of the adhesive coating in a range between 0 $g/m^2$ and 1 $g/m^2$, or in a range between 0.1 $g/m^2$ and 1 $g/m^2$.

A dry weight content of the adhesive coating after being removed from the face or from the carrier may be 0.1-5% lower than a dry weight content of the adhesive coating applied onto the face/carrier.

A speed of the substrate (such as the face) may be in a range between 100 m/min and 600 m/min, and/or a dwell time between applying the adhesive coating and removing the adhesive coating may be from 0.05 to 3 seconds.

The adhesive coating may be dried on the face or on the carrier material into the pressure sensitive adhesive coating. If the adhesive coating is dried on the carrier material, the adhesive is dried into the pressure sensitive adhesive before the adhesive is transferred on to the second side of the face.

The adhesive coating may be dried at a temperature in a range between 60° C. and 100° C.

Temperature of the linerless label web when exiting thermal drying may be arranged to be from 5 to 15 degrees C. below an activation temperature of the direct thermal printable coating.

In an embodiment, the adhesive coating may be dried, for example on the carrier material, at a temperature that is at least 10 degrees C. higher than the temperature of the linerless label web when exiting thermal drying.

The carrier material may be a reusable batch of a web material, or an endless belt.

As discussed above, the direct thermal linerless label for on-demand printing comprises a face having the first side and the second side. The face comprises a direct thermal printable coating. Further, the direct thermal linerless label comprises a pressure sensitive adhesive coating comprising PSA and silicone additive on the second side of the face.

The pressure sensitive adhesive coating can comprise
an adhesive, wherein the amount of the adhesive may be in a range between 90 wt. % and 99 wt. % calculated from the total dry weight of the pressure sensitive adhesive coating, and
a silicone additive, the amount of the silicone additive being in a range between 1 wt. % and 6 wt. %, preferably in a range between 2 wt. % and 4 wt. % calculated from the total dry weight of the pressure sensitive adhesive coating.

The adhesive is most preferably an acrylic water-based adhesive.

Water-based acrylic adhesives and silicone additive have not traditionally been easily mixed with each other. The silicone additive may be mixed with the water-based acrylic adhesive in a form of emulsion in order to form the adhesive coating comprising the silicone additive and the adhesive. Thus, the silicone additive may be supplied in the form of an aqueous emulsion.

The silicone additive may be added in a form of an aqueous emulsion which contains an emulsifier. In an embodiment, the emulsifier is nonionic or anionic, such as slightly anionic.

The total coverage of the pressure sensitive adhesive coating, calculated from the total surface area of the second side, may be equal to or less than 90%, preferably equal to or less than 70%, and most preferably equal to or less than 50%, calculated from the total surface area of the second side.

The total coverage of the pressure sensitive adhesive coating, calculated from the total surface area of the second side, may be equal to or more than 10%, more preferably equal to or more than 20%, and most preferably equal to or more than 30%, calculated from the total surface area of the second side.

The pressure sensitive adhesive coating may be arranged on the second side of the face as continuous stripes in a first direction (i.e., longitudinal direction) of the web, having a minimum area of 10%, preferably 15%, more preferably 25% and most preferably 35% calculated from a total width of the label web.

The pressure sensitive adhesive coating comprising the silicone additive may have a coat weight equal to or less than 25 g/m$^2$ more preferably equal to or less than 21 g/m$^2$, and most preferably equal to or less than 16 g/m$^2$, calculated as total dry weight of the pressure sensitive adhesive coating on the second side.

The pressure sensitive adhesive coating comprising the silicone additive may have a coat weight equal to or more than 5 g/m$^2$, more preferably equal to or more than 10 g/m$^2$, and most preferably equal to or more than 15 g/m$^2$, calculated as total dry weight of the pressure sensitive adhesive coating on the second side.

The amount of the silicone additive may be equal to or more than 1 wt. %, more preferably equal to or more than 1.5 wt., and most preferably equal to or more than 1.9 wt. %, calculated from the total dry weight of the adhesive coating.

The amount of the silicone may be equal to or less than 6 wt. %, more preferably equal to or less than 3.5 wt. %, and most preferably equal to or less than 2.7 wt. % calculated from the total dry weight of the adhesive coating.

The direct thermal linerless label may be used in on-demand printing.

Thanks to the novel solution, many advantages may be obtained. For example, it is possible to obtain a linerless label for on-demand linerless label printer in a cost-effective manner, which linerless label may have improved properties for the printer as well as for the labelling purpose.

Further, the adhesive coating comprising PSA and silicone additive, preferably water-based acrylic PSA and silicone additive, improves the functioning of the motorized or manual guillotine in linerless printers. Adhesive comprising silicone additive, and particularly water-based acrylic PSA comprising silicone additive, is easier to cut through mechanically in such devices with less adhesive residue left on the cutting blade or edge. Further, thanks to properly selected coat weights and drying/curing methods to suit, it might be easier to achieve good anchorage with water-based acrylic PSA onto the substrate, in some cases even without any additional primer being used.

DETAILED DESCRIPTION

Figure 1:
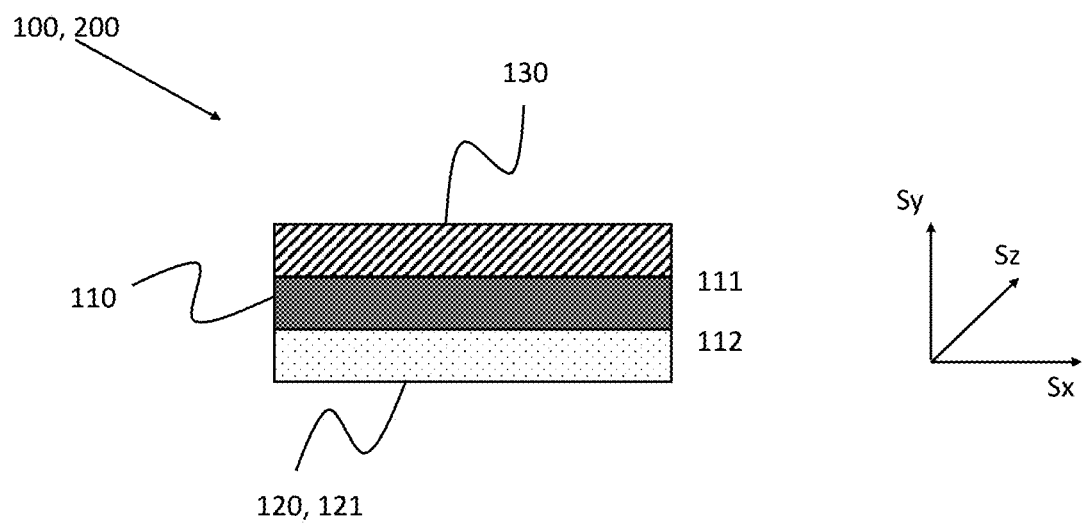
FIG. 1 illustrates, by way of an example, an $S_x,S_y$-cross-section of a linerless label (web)

The solution is described in the following in more detail with reference to some embodiments, which shall not be regarded as limiting.

In this specification, references are made to the figures with the following numerals and denotations:
Sx, Sy, Sz 3D coordinates,
100 linerless label web,
110 face, face stock,
111 first side, i.e., top side,
112 second side, i.e. bottom side,
120 modified pressure sensitive adhesive coating (PSA) comprising adhesive and silicone additive,
121 modified adhesive coating comprising adhesive and silicone additive,
130 release coating, release coating layer, 150 adhesion-free area,
150a adhesion-free areas/stripes on the longitudinal edges,
200 linerless label, label (product),
240 label printer,
401 arranging a face stock,
402 applying water-based adhesive,
402a applying water-based adhesive on face,
402b applying water-based adhesive on carrier material,
403 arranging adhesion-free areas,
404 ensuring pre-determined level of moisture,
405 drying the adhesive coating,
406 transferring the adhesive onto face material,
407 winding the material into linerless roll,
560 drying unit,
561 drying device,
570 linerless label roll,
580, coating unit for applying adhesive,
580a transfer roll of a coating unit,
580b nozzle of a coating unit,
590 moisturizing unit for ensuring pre-determined level of moisture,
611, 611a, 611b carrier material,
611a belt,
611b web material,
612 face unwinder,
650 cooling cylinder,
660 roll nip,
690 adhesive removal unit,
710 carrier unwinder,
770 linerless label web winder,
780 carrier rewinder, and
870 blocking shims.

In this specification term "comprising" may be used as an open term, but it also comprises the closed term "consisting of".

Unit of temperature expressed as degrees C. corresponds to ° C.

Percentage values relating to an amount of a material are percentages by weight (wt. %) unless otherwise indicated. All percentage values refer to dry weight unless otherwise indicated.

Term "web" refers to a continuous sheet of material. The web is generally processed by moving over rollers. Between processing stages, webs may be stored and/or transported as rolls.

In this application, the term "linerless label web" refers to a continuous direct thermal web comprising a face 110 and pressure sensitive adhesive 120, wherefrom the linerless labels 200, i.e. the individual labels, may be separated. Conventional linerless label webs may not have the same challenges as the direct thermal linerless label webs due to the direct thermal coating therein.

In this application, the terms "label", "linerless label" and "adhesive label" refer to an individual direct thermal label product 200 separated from the direct thermal linerless label web 100 to be applied onto an article, unless otherwise indicated. The label 200 may be adhered onto an article by using an adhesive. Thus, in this application, the terms "label", "linerless label" and "adhesive label" refer to a product comprising the direct thermal face 110 and the pressure sensitive adhesive coating 120 comprising an adhesive and a silicone additive, unless otherwise indicated.

The terms "linerless label (web)" and "label 100, 200" refers to the label 200 and/or to the linerless label web 100.

Term "machine direction" refers to manufacturing direction of a web. Machine direction may also refer to a circumferential direction of a roll. Further, longitudinal direction of a web refers to the machine direction. In this application, the term "first direction" refers to the machine direction.

Terms "cross direction" and "cross machine direction" and "transversal direction" refer to a direction that is transversal to the machine direction. In this application, the term "second direction" refers to the cross direction.

The term "face" refers to a substrate of the label, also called as a face stock or a face material. In case of a plastic face material, it may also be called a face film.

In this application, the term "adhesive coating" refers to a coating comprising adhesive and silicone additive, unless otherwise indicated. Preferably, the modified adhesive coating comprises water-based acrylic adhesive(s) and silicone additive. Further, the term "adhesive layer" refers to an adhesive layer comprising an adhesive and a silicone additive, unless otherwise indicated. The adhesive layer may be a continuous layer, or alternatively, the adhesive layer may be a layer comprising, for example, adhesive strips.

The term "PSA" refers to pressure sensitive adhesive(s).

Face

The face 110 may have a monolayer structure, or it may have a multilayer structure comprising at least two layers. The face 110 is the layer that is adhered to a surface of an article during labelling through an adhesive coating. The face 110 comprises a first side 111 and a second side 112. The second side is an adhesive side, and the first side 111 is a print side comprising the direct thermal coating. The face 110 may comprise e.g. a print to provide information and/or visual effect.

Further, the linerless label (web) 100, 200 may contain additional layers, for example top coatings or overlaminates to protect the top surface and/or print of the label against rubbing or other external stress. Further, a primer may enable enhancing compatibility of adjacent layers or parts of the label, for example adhesion between the layers. The face 110 and/or the linerless label (web) 100, 200 may contain one or more barrier layers to prevent chemical substances from migrating through a surface of the first side 111 of the face or a surface of the second side 112 of the face, or other interfaces of the linerless label (web) 100, 200.

The first side 111 of the linerless label (web) can be printable by using heat. A linerless label (web) 100, 200 comprising a face 110, a print layer and a pressure sensitive adhesive coating 120 may be referred to as a printed label.

The face 110 is attached to another surface with the modified adhesive coating 120 when the label 200 is used. Thus, when label 200 is used, the modified adhesive coating 120 comprising an adhesive and silicone additive bonds the label 200 to the surface of an item while the silicone additive may prevent the linerless label printer 240 from an accumulation of the adhesive coating to a blade and rolls of the linerless label printer. Said accumulation of the adhesive might result shortened printer service cycle.

The face 110 may comprise a paper comprising natural fibres as its main raw material. Natural fibres refer to any plant material that contains cellulose. The natural fibre may be wood based. The wood based natural fibre may be from softwood trees, such as spruce, pine, fir, larch, douglas-fir or hemlock, and/or from hardwood trees, such as birch, aspen, poplar, alder, eucalyptus or acacia, or from a mixture of softwoods and hardwoods. The face 110 may comprise cellulose fibers from both hardwood and softwood. A mixture of hardwood and softwood may be used to improve the internal bond strength of the face 110.

A paper suitable for the face 110 is typically so-called wood-free paper. Wood-free refers to chemical pulp, such as Kraft pulp. In accordance with an embodiment, a pulp used for making the face does not contain any kind of mechanical pulp due to high quality requirements of the face. Thus, the face 110 may be a wood-free paper comprising fibers e.g. from softwoods and/or hardwoods.

The face 110 may comprise, for example, at least one filler selected from a group comprising clay, calcined clay, kaolin, natural ground calcium carbonate, precipitated calcium carbonate, talc, calcium sulphate, and titanium dioxide. Further, the face may comprise additives. The total amount of the fillers in the face 110 is preferably less than 10 weight-%, more preferably less than 5 weight-%, and most preferably less than 3 weight-%, for example between 0.5 and 5 wt.-%, or between 0 wt.-% and 3 wt.-%, based on the total weight of the face 110. The fillers may decrease costs of the manufactured product. However, the mineral fillers may also decrease strength properties of the face 110. Further, if the face comprises too much mineral fillers, some properties of the face 110 may be compromised. Thus, in an example, the face 110 does not comprise said mineral fillers.

The face 110 may comprise a paper which is coated with one or more coatings. For coated papers, a coat weight in the range of 1 to 12 g/m$^2$ per side (on one or both sides) may be used. The coating layer(s) may comprise at least one pigment selected from a group comprising clay, calcined clay, kaolin, natural ground calcium carbonate, precipitated calcium carbonate, talc, calcium sulphate, and titanium dioxide. Further, said coating layer(s) may comprise binders, such as starch and/or polyvinyl alcohol.

A face 110 comprising a paper may be calendered with a calender or a supercalender to obtain a high-density surface.

In addition to the paper, or alternatively, the face 110 may comprise a filmic material such as polyethylene (PE), polypropylene (PP) or biaxially oriented polypropylene (BOPP). Also, other suitable materials, such as different types of polyesters such as polyethylene terephthalate (PET) or polyethylene(s) are possible.

The grammage of the face 110 is preferably at least 50 g/m$^2$, more preferably at least 60 g/m$^2$. Further, the grammage of the face is preferably less than 85 g/m$^2$, more preferably equal to or less than 80 g/m$^2$. Grammage may be, for example, in a range between 50 g/m$^2$ and 82 g/m$^2$ or in a range between 70 and 80 g/m$^2$. Said grammage can be particularly suitable for the linerless label comprising the direct thermal printable coating, and for use in on-demand linerless label printers. The grammage can be measured according to standard ISO536.

The face 110 may have a static sensitivity below 90 degrees C., preferably in a range between 75° C. and 90° C. The static sensitivity needs to be high enough so that the product is not darkening before printing, for example during transportation. However, the linerless label (web) 100, 200 should be sensitive enough to be thermally printable.

The face 110 may have an optical density of below 25 mJ/mm$^2$, preferably below 20 mJ/mm$^2$' and more preferably below 15 mJ/mm$^2$, such as between 10 mJ/mm$^2$ and 15 mJ/mm$^2$. Too high optical density may cause many challenges to the product. Further, low optical density may speed up the linerless label printer. Moreover, thanks to low enough optical density, the linerless label may not cause too many demands for the printer.

The face 110 may have a caliper in a range between 60 μm and 85 μm, measured according to ISO534. If the face it is too thin, the linerless label (web) 100, 200 may be difficult to handle. For example, if the face is very thin, a stiffness of the linerless label may go too low causing the linerless label to be too sloppy. Thus, the linerless label (web) may be difficult to manufacture and/or the linerless label (web) may cause problems when used with a linerless label printer.

The top side of the linerless label may have a smoothness at least in a range between 350 sec and 550 sec (Beck), measured according to standard ISO5627. For example, by using a face comprising a paper, if the paper is too rough, the life of the print head may decrease too much. For example, a silicon layer on top of the face will smooth the linerless label (web) and, hence, the product may be better for printers. Thus, in an embodiment, the first side of the linerless label may have a smoothness of equal to or more than 1000 sec (Beck), measured according to standard ISO5627.

The linerless label (web) may have a brightness higher than 85% (R457) when measured according to standard ISO2469. Therefore, the linerless label may look nice. Further, high brightness may create a contrast between the symbols/letters. Thus, if the letters comprise some machine-readable letters, the letters may be easily read thanks to said brightness.

The linerless label may have an opacity higher than 80%, such as in a range between 80 and 90, when measured according to standard ISO2471. Thanks to said opacity, the surface of the linerless label may not be too transparent for a machine, or a human eye, to read.

The face 110 and/or the linerless label (web) may have a tensile strength in the machine direction (i.e., the first direction) higher than 40 N/15 mm, preferably higher than 45 N/15 mm, when measured according to standard ISO1924/2. Thus, dimensional stability of the linerless label (web) may be improved, which may have a positive effect on manufacturing process and printing process.

The face 110 and/or the linerless label (web) may have a tensile strength in the cross direction (i.e., the second direction) higher than 10 N/15 mm, when measured according to standard ISO1924/2. Thanks to said strength, a dimensional stability of the linerless label may be improved, which may affect manufacturing process and printing process.

The face 110 may have a paper substrate manufactured from FSC™-certified (mix credit) pulp. Thus, the face may comprise or consist of environmentally friendly material. Thus, the novel linerless label (web) may be better for the environment than some other kind of face materials.

An Example of a Direct Thermal Printable Coating

The face 110 comprises a direct thermal printable coating. Thus, the face 110 may be called a thermally direct printable face. The direct thermal printable coating is arranged to provide thermal printability for the face 110. The direct thermal printable coating is arranged to form a thermal sensitive, reactive layer changing color during the thermal printing. The thermal coating comprises reactive components. The thermal coating may comprise a matrix. The matrix may comprise a dye and a developer.

The thermal coating matrix in a solid state is heated by a thermal print head above its activation point and/or melting point. The dye of the thermal coating may comprise a leuco type dye. The leuco type dye is arranged to react with an acid and change into a colored form. Thermal coating may comprise a dye, a developer, a sensitizer, a binder, and a stabilizer.

The developer is arranged to co-react with the dye above activation temperature during thermal printing. Reaction of the dye with the developer is arranged to trigger color formation. Developer may comprise sulfonyl ureas, zinc salts of substituted salicylic acids or phenols, for example Bisphenol A (BPA) or Bisphenol S (BPS). The thermal coating may preferably be BPA free, Bisphenol (BP) free or Phenol free for increased chemical safety.

Sensitizer may be used in a thermal coating to decrease melting point of a dye and/or a developer. Dye and developer are arranged to react when heated above melting point of matrix of the thermal coating. The melting point of the matrix may depend on melting point values of its components. Thermal threshold of the thermal coating is melting point of the component of the thermal coating having the lowest melting point. Sensitizer of the thermal coating may be arranged to decrease melting point of dye and/or developer. This has effect of proving accuracy to the melting point and/or optimizing temperature of color change and/or facilitating mixing of dye and developer.

Optionally, the thermal coating may comprise stabilizers. Dyes in thermally sensitive paper may be unstable tending to return to their original colorless crystalline form. The thermal paper may be sensitive, for example, to hot and humid external conditions. In order to stabilize the metastable glass formed by leuco dye, developer and sensitizer, a stabilizer may be added to the mixture. Stabilizers may affect inhibiting recrystallization of the dye and developer and/or stabilizing the print.

Binder of the thermal coating may have an effect of facilitating the thermal coating to adhere to a base substrate or to a pre-coat. Binder may comprise double bonds. The binder may comprise polyvinyl alcohol (PVA) or latex, for example a styrene butadiene latex (SB) or a styrene acrylic (SA).

The face 110 may be pre-coated. A pre-coating may have effect of reducing heat transfer from a thermal coating to the substrate. This may enable enhanced or high-resolution print to be formed. The pre-coat may have effect of providing smoothness to the substrate, i.e. the top surface of the face 110.

Smoothness of the face 110 comprising paper has positive effect on printing, for example by providing better resolution. The pre-coat may have positive effect on printing quality.

Sensitivity of the thermal coating refers to the degree to which it reacts to a given amount of heat or energy. Sensitivity is a decisive factor in the selection of the right thermal coating or thermal paper. It may be depicted in graphs plotting a curve of image density or optical density (OD) against the amount of heat or energy transferred. Optical density is a measure of a relationship between incident and reflected light. An optical density of approximately 1.1 is usually a full black to the human eye. Lower optical densities thus correspond to varying shades of grey. Thermal coatings and thermal papers are typically characterized by using static and dynamic sensitivity.

Static sensitivity indicates the temperature at which a thermal paper will begin imaging, i.e. changing color. Thermal papers with low static sensitivity only begin imaging at high temperatures, for example at above 90 degrees C. Thermal papers with medium static sensitivity on the other hand begin imaging at lower temperatures, for example at between 80 and 90 degrees C. High static sensitivity thermal papers start to react even at lower temperatures, for example at 65-80 degrees C., or at 70-80 degrees C.

Dynamic sensitivity of thermal papers indicates in practice how fast a thermal paper can be printed. This is especially relevant in the selection of the right thermal paper for a particular thermal printer, since the higher the dynamic sensitivity of the paper, the faster the printer can operate without any settings having to be changed. Dynamic sensitivity is typically indicated as mJ/mm$^2$. Thus, thermal papers with low dynamic sensitivity require higher print head temperature and/or longer exposure, i.e. slower printing speed to achieve high optical density of the image. On the other hand, high dynamic sensitivities allow faster printing even with lower print head temperatures.

Dynamic sensitivity is challenging to categorize by using unambiguous, single numerical values (for example energy levels in mJ/mm$^2$) into low, medium and high categories because the total energy level delivered into the paper does not directly correspond to a certain temperature reached in the thermal coating. The heat capacity of the thermal paper is related, for example, to the thickness of the paper and existence of different material or material layers. Thus, different amount of energy may be needed to heat papers having different thicknesses to the same temperature. Different paper thicknesses or thermal conductivity of various layers may cause different temperature levels in the thermal coating.

For example, at optical density 1.1 (full black for a human eye) very different energy levels may be required to reach such full color change in the thermal coating layer. A high dynamic sensitivity thermal paper may reach such optical densities already at energy levels below 15 mJ/mm$^2$, a medium dynamic sensitivity may require something around 20 mJ/mm$^2$, for example energies in the range of 15-25 mJ/mm$^2$, and a low dynamic sensitivity thermal paper may require energy levels even above 25 mJ/mm$^2$ for the same darkness of the print. Each of these papers may still start to have some color change in much lower energy levels, for example, already below 10 mJ/mm$^2$.

High static sensitivities may be preferred combined with high dynamic sensitivity allowing fast printing with economic and simple linerless printers. Temperature of the surface of a labelled item is not likely to exceed 65-70 degrees C., which allows the use of some thermal papers with medium static sensitivity, and more preferably thermal papers with high static sensitivity approaching those maximum surface temperatures of the labelled items. On the other hand, long term stability is not an issue in these short-lived applications making it possible to use more economical thermal papers which are not designed specifically for archiving or longer-term stability. Such high static and dynamic sensitivity of the thermal coating/paper may place challenges in manufacturing of the direct thermal printable linerless labels because it sets limit to the highest temperatures that the direct thermal face material can be exposed to during manufacturing of the linerless label product in order to prevent unwanted and premature color changes of the thermally sensitive coating.

Adhesive Coating (Layer) and Pressure Sensitive Adhesive Coating (Layer)

Direct thermal printable coating of the face has traditionally prevented utilizing water-based adhesives with linerless labels. Thanks to the solutions of the present application, the water-based adhesives can be used with the direct thermal printable coating.

During a manufacturing process of the linerless label (web) 100, 200, a modified adhesive coating 121 comprising an adhesive and a silicone additive is dried into a pressure sensitive adhesive coating 120 comprising the silicone additive and the adhesive.

Thus, the modified adhesive coating (layer) 120, 121 comprises at least said water-based acrylic adhesive and emulsified silicone additive. Therefore, the obtained linerless label (web) 100, 200 comprises a modified adhesive coating comprising the pressure sensitive adhesive and silicone additive.

The silicone additive in the modified adhesive coating 120, 121 may improve the easiness of cutting of the label material, particularly with an on-demand linerless label printer. Further, the silicone additive in the modified adhesive coating 120, 121 may improve the self-woundability of the linerless label web 100. Thus, thanks to the silicone additive in the modified adhesive coating 120, 121 the linerless label web 100 may be self-wound around itself without tendency of blocking the adjacent layers of the linerless label web 100 to each other.

Thus, the label 200 and the linerless label web 100 disclosed herein comprise a modified adhesive coating 120 comprising adhesive (PSA) and silicone additive, which modified adhesive coating 120 is arranged on the second side 112 of the face 110. The pressure sensitive adhesive coating 120 may also be called a self-adhesive coating.

The pressure sensitive adhesive coating layer 120 may comprise one or more layers of water-based adhesive comprising emulsified silicone additive. If the PSA coating 120 comprises more than one layer of adhesive, the adhesive coating may have improved smoothness. For example, if the first adhesive coating layer comprises any small holes, these may be filled with the second adhesive coating layer.

In an embodiment, the pressure sensitive adhesive 120 has a maximum tack value of equal to or less than 12 N, more preferably equal to or less than 6 N and most preferably between 3 N and 6 N as measured on glass according to FINAT test method FTM9. Said values may be particularly suitable performance values for the pressure sensitive adhesive coating 120 of the direct thermal linerless label (web) 100, 200 for quick service restaurants.

In another embodiment, the pressure sensitive adhesive 120 has a maximum tack value of equal to or more than 8 N, more preferably equal to or more than 10 N as measured on glass according to FINAT test method FTM9. Said values may be particularly suitable performance values for the pressure sensitive adhesive coating 120 of the direct thermal linerless label (web) 100, 200 for industrial food or retail labeling.

In another embodiment, the pressure sensitive adhesive 120 may have a maximum tack value of equal to or more than 15 N, more preferably equal to or more than 17 N as measured on glass according to FINAT test method FTM9. Said values may be particularly suitable performance values for the pressure sensitive adhesive coating 120 of the direct thermal linerless label (web) 100, 200 for logistic and warehouse.

Properties and characteristics of the PSA used herein may vary depending on the end use of the label in question. Some properties are illustrated by Table 1 showing some preferred values and factors for the adhesives for different end uses.

TABLE 1

|  |  | Retail labelling | Logistic & warehouse | Industrial food | Quick service restaurant |
|---|---|---|---|---|---|
| Labelling environment | (degrees C.) | 18 . . . 25 | 10 . . . 25 | −2 . . . 8 | 18 . . . 30 |
| Labelling environment (substrate) | (degrees C.) | 8 . . . 25 | 10 . . . 25 | −20 . . . 8 | 8 . . . 60 |
| Environment (substrate) |  | Dry | dry | condens. exists | condens. exists |
| Service temperature | (degrees C.) | 4 . . . 25 | 0 . . . 25 | −20 . . . 25 | 18 . . . 30 |
| Adhesive characteristics |  | permanent | permanent | permanent | removable |
| Adhesion (tack) | N/25 mm FTM9 | ≥8 | ≥17 | ≥10 | 3 . . . 6 |
| Coat weight (dry) | (g/m²) | 15 . . . 20 | 18 . . . 25 | 15 . . . 20 | 15 . . . 20 |

The PSA may be permanent adhesive, or it may be removable or repositionable, or even ultra-removable. The PSA may have a working temperature from ambient to freezer temperatures.

The pressure sensitive adhesive 120 may have a maximum tack value of equal to or more than 3 N, more preferably equal to or more than 4 N measured on glass according to FINAT test method FTM9. Said values may be suitable performance values for the pressure sensitive adhesive coating 120 of the direct thermal linerless label (web) 100, 200.

The pressure sensitive adhesive may be used for permanent linerless label (web) or removable linerless label (web). For removable linerless label (web), the maximum tack value is preferably between 3 N and 6 N measured on glass according to FINAT test method FTM9. For permanent linerless label (web), the maximum tack value is preferably equal to or more than 8 N, more preferably equal to or more than 10 N, and most preferably equal to or more than 17 N, measured on glass according to FINAT test method FTM9.

Within context of this specification, the PSA is most preferably water-based PSA. Water-based adhesives can provide better sustainability with less fossil based raw materials and less volatiles involved both during the manufacturing and during end use. These benefits can be seen, for example via Life Cycle Analysis for Cradle-to-Gate or Cradle-to-Grave.

Further, it may be easier to achieve a good anchorage level with water-based PSA onto the face 110 disclosed herein even without any additional primer being used. Thus, in an embodiment, the water-based pressure sensitive adhesive 120 is directly in contact with the face 110, without any further coating layers between the PSA and the face.

Still further, water-based adhesives may be designed to have approval for direct or indirect food contact (food-safety), which is a requirement in certain food related label end use areas.

The pressure sensitive adhesive can be suitable for high coating speeds. Preferably, the adhesive gives reticulation free coatings at coat weights of 10-30 g/m² (dry coat weight). The adhesive may be plasticizer-free and may be used on thermal papers (including economy grades) without issues of premature image development or image fade.

Preferably, the adhesive exhibits sufficient anchorage to the face 110 and resistance to face stock penetration, such that priming is not required. Flat adhesion profile over extended dwell-time and/or sufficient cohesion in order to resist winging on curved surfaces may be preferred.

Preferably, the water-based PSA is acrylic-based. The water-based acrylic PSA may have many advantages over other kinds of PSAs. Water-based acrylic PSA may be very environmentally friendly. Further, tackiness of the product may improve thanks to the water-based acrylic adhesive. Furthermore, hot melt adhesives may cumulate more easily into cutting machines than water-based acrylic adhesives. Still further, acrylic adhesives may have a longer open time, hence, linerless label (web) comprising water-based acrylic PSA may be removed after some seconds or minutes, if needed. On the contrary, hot melt adhesives cannot typically be removed from a surface, even if attached onto a wrong surface. Thus, removability of the water-based acrylic adhesive may be better than removability of the hot melt adhesives. Moreover, peel values of the acrylic based adhesive typically differ from peel values of the hotmelt based adhesives.

Traditionally, silicone cannot be readily mixed with water based acrylic PSA to form a stable adhesive emulsion. The water-based acrylic adhesive may therefore be supplied in the form of an aqueous dispersion comprising an emulsifier and the silicone additive. The silicone additive itself may be also in a form of a silicone emulsion before being mixed into the acrylic adhesive. The emulsifier may be required in order to form a stable adhesive emulsion while applying the water-based acrylic adhesive on a surface of a face or a carrier material.

The adhesive in a form of the aqueous dispersion or emulsion may be further mixed with a wetting agent. The wetting agent may be necessary to be able to coat the adhesive dispersion/emulsion on a siliconized surface when the modified adhesive coating is applied onto a separate siliconized carrier substrate for adhesive drying and curing, or alternatively if it is applied directly on the siliconized thermal face for drying and curing.

The silicone component in the emulsified silicone additive may be a polydimethylsiloxane.

The modified adhesive coating 120, 121 comprises the silicone additive. The silicone additive is preferably mixed with the water-based adhesive together with an emulsifier, hence, a substantially uniform adhesive layer 120, 121 comprising said silicone additive may be formed.

The modified adhesive coating 120, 121 may comprise or consist of the mixture comprising said water-based acrylic adhesive, at least one emulsifier, and said silicone additive.

The silicone additive used in the adhesive layer is preferably recyclable. Most preferably, the modified adhesive coating comprises an emulsifier and a wetting agent.

Advantageously, a silicone additive is added to an acrylic water-based adhesive in order to form the modified adhesive coating 121. This combination may significantly reduce adhesive accumulation to a guillotine blade of an on-demand printer. Further, the acrylic water-based adhesive may be environmentally friendly adhesive, which may be used e.g. with food materials. Thus, the linerless label (web) 100, 200 may be used together with food packages.

Further, the combination of water-based acrylic adhesive and silicone additive in the modified adhesive coating 120, 121 may also reduce adhesive accumulation to rolls and other parts of a web guide of the linerless printer. This may bring advantages as it may give a wider room to use more aggressive adhesives without shortening the service cycle of an on-demand printers. Further, this combination may enable lengthened service cycle. Therefore, thanks to the acrylic water-based adhesives together with the silicone additive, linerless label (web) 100, 200 may be used with linerless label printers so that the service cycle of the printer may not be shortening.

The pressure sensitive adhesive layer 120 comprising the silicone additive may have a coat weight in a range between 10 and 30 g/m² (dry coat weight). Further, the adhesive layer 120 comprising the adhesive and the silicone additive preferably has a coat weight in a range between 15 g/m² and 25 g/m² (dry coat weight), most preferably in a range between 16 g/m² and 21 g/m². Preferably, to obtain an adhesive layer that is good enough to attach the linerless label to the surface of an item without being too expensive, the adhesive is a water-based PSA, which is acrylic-based.

The amount of emulsified silicone additive in the adhesive layer can be equal to or more than 1 wt.-%, more preferably equal to or more than 1.5 wt. %, and most preferably equal to or more than 2 wt. %, calculated from the total dry weight of the adhesive coating layer. This grammage may provide an improved usability of the linerless label for printers. Further, the amount of the emulsified silicone additive can be equal to or less than 6 wt. %, more preferably equal to or less than 5 wt. %, and most preferably equal to or less than 4 wt. %, Thus, it may be possible to obtain cost effective solution having good adhesive properties. The amount of the emulsified silicone additive on the adhesive layer may be, for example, between 1 to 6 wt. %, or between 2 wt. % and 4 wt. %, calculated from the total dry weight of the adhesive coating layer.

In an embodiment, the amount of emulsified silicone additive in the adhesive layer may be equal to or more than 0.1 g/m². Advantageously the amount of the emulsified silicone additive in the adhesive layer may be at least 0.15 g/m², more preferably at least 0.2 g/m² (dry grammage) to provide an improved usability of the linerless labels for printers. Advantageously, the amount of the emulsified silicone additive may be 1.7 g/m² at the most, more preferably 1.3 g/m² at the most, and most preferably equal to or less than 1.1 g/m² (dry grammage) in order to provide cost effective solution. The amount of the emulsified silicone additive on the adhesive layer may be, for example, between 0.15 and 1.5 g/m², or between 0.2 and 1.2 g/m² (dry grammage).

The silicone additive may be supplied in the form of an aqueous emulsion. In order to form substantially uniform mixture, the silicone additive is preferably added on the form of an aqueous emulsion which contains an emulsifier. The emulsifier may lower the surface tension between the water-based acrylic adhesive and the silicone. The emulsifier agent may comprise hydrophilic and hydrophobic groups. Thus, in an embodiment, the emulsifier agent molecules may encapsulate silicone with their hydrophilic parts extending out.

The emulsifier and/or the wetting agent is/are preferably anionic or nonionic. More preferably, the emulsifier and/or the wetting agent may be anionic.

Thanks to the emulsifier, the silicone additive may not float in the water, but the silicone additive can be mixed ("dissolved") in the water-based solution.

Further, thanks to the wetting agent, the easiness of the adhesive coating process may be improved.

The silicone additive may be added into the modified adhesive coating by adding silicone emulsion into acrylic water-based adhesive, thereby forming the modified adhesive coating 121.

Thus, the modified adhesive coating layer 121 may comprise silicone emulsion. In an advantageous embodiment, the silicone emulsion may have an average particle size in a range between 0.1 microns and 1 micron. This may improve the properties of the emulsified silicone additive. Preferably, the average size of the particles is between 0.1 microns and 0.4 microns, and most preferably between 0.1 microns and 0.2 microns.

However, most preferably, the adhesive used in the modified adhesive coating 120, 121 is acrylic water based adhesive and the silicone additive in the adhesive coating 120, 121 is preferably added as silicone emulsion. Silicone emulsion, when mixed to the water-based adhesive in a range between 1 wt. % and 6 wt. %, preferably in a range between 2 wt. % and 4 wt. %, may modify the adhesive performance so that immediate adhesion for very quickly moving metallic blade in the printer/labelling process is significantly decreased.

The pressure sensitive adhesive coating 120 of the produced linerless label (web) 100, 200 may have a thickness of at least 10 µm, preferably at least 12 µm or at least 14 µm, and most preferably equal to or more than 16 µm. The coat weight of the PSA needs to be high enough to fill the pores of the surface. Thus, the thickness of the PSA may depend on the surface to be coated. Further, the amount of the PSA needs to be high enough to attach the label onto the surface of an object. Advantageously, said thickness of the pressure sensitive adhesive coating 120, 121 is equal to or less than 40 µm, preferably equal to or less than 30 µm, more preferably equal to or less than 25 µm, and most preferably equal to or less than 20 µm. The thickness of the adhesive layer may be, for example, between 16 and 20 microns. Therefore, it is possible to obtain an adhesive layer that is good enough to attach the linerless label to a surface of an item without being too expensive.

The adhesive layer applied on the linerless label comprises a silicone additive, i.e., a silicone polymer-based compound. Silicone compounds may improve the easiness of the usage of the linerless label (web) 100, 200. The chemistry of the silicone affects the force required to release the adhesive layer 120 (and therefore the face layer) from a substrate. The silicone additive in the adhesive coating may protect the adhesive coating layer 120, 121 and allow efficient handling when the label is adhered to a substrate. Further, while protecting the adhesive layer, the silicone additive may further protect the linerless label printer from the adhesive layer.

The silicone additive may protect the linerless label printer, because the silicone additive may decrease a surface energy of the adhesive layer. Thus, the label may be easily cut so that the adhesive is not attaching to the printer. Therefore, the linerless label adhesive coating comprising adhesive and silicone additive may be used for minimizing adhesive accumulation to a cutter blade, rolls, and web path in linerless printers.

Figure 6:
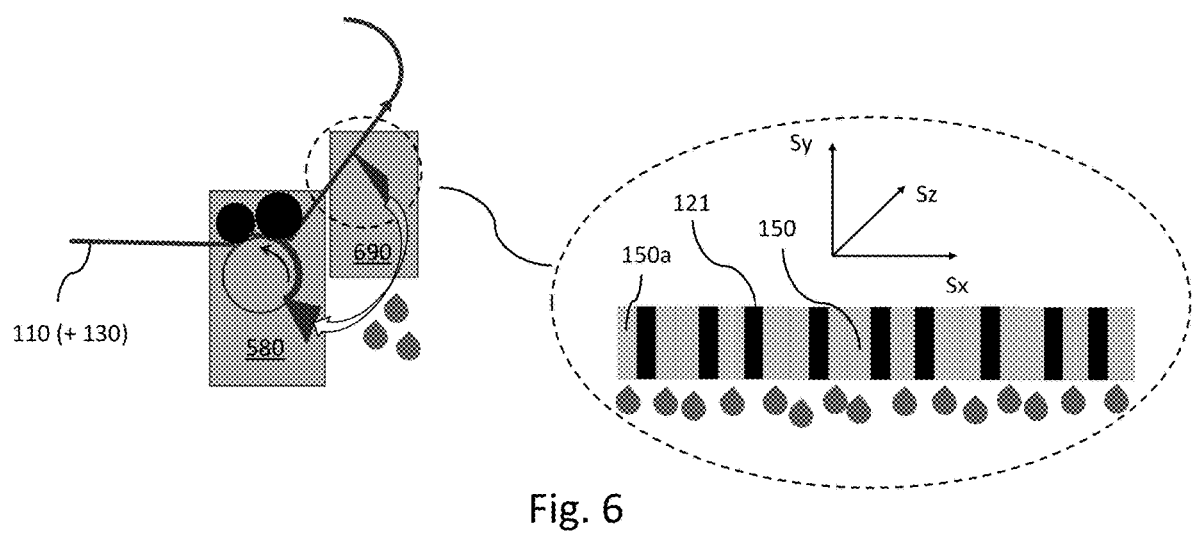
FIG. 6 illustrates, by way of an example, a detail of a manufacturing method and an apparatus according to an embodiment.
Figure 7:
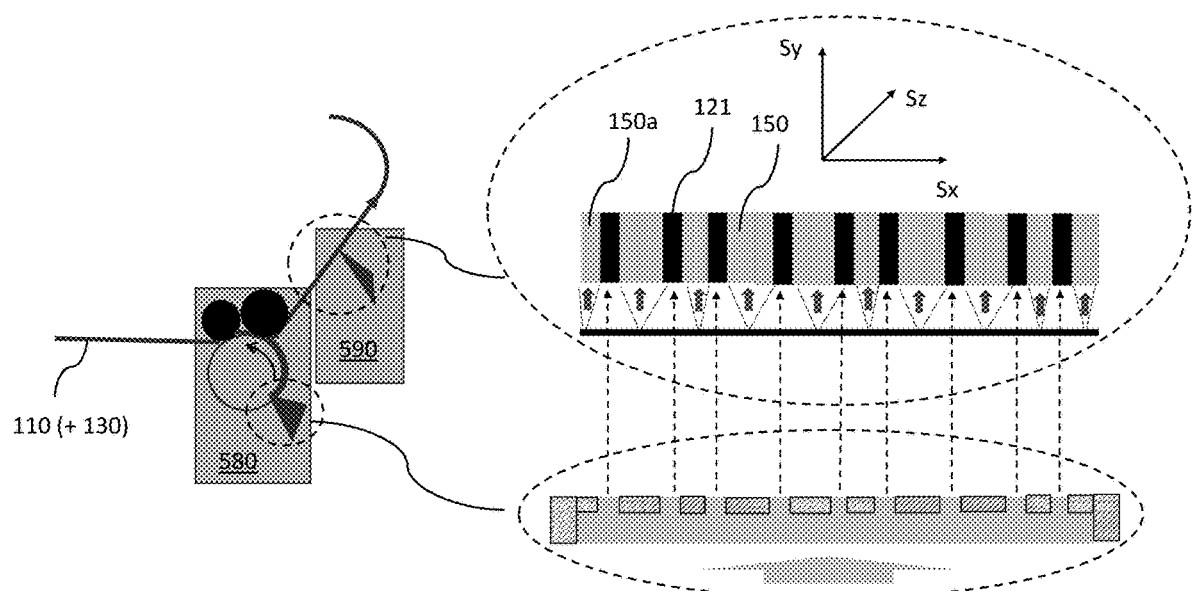
FIG. 7 illustrates, by way of an example, a detail of a manufacturing method and an apparatus according to an embodiment.
Figure 8:
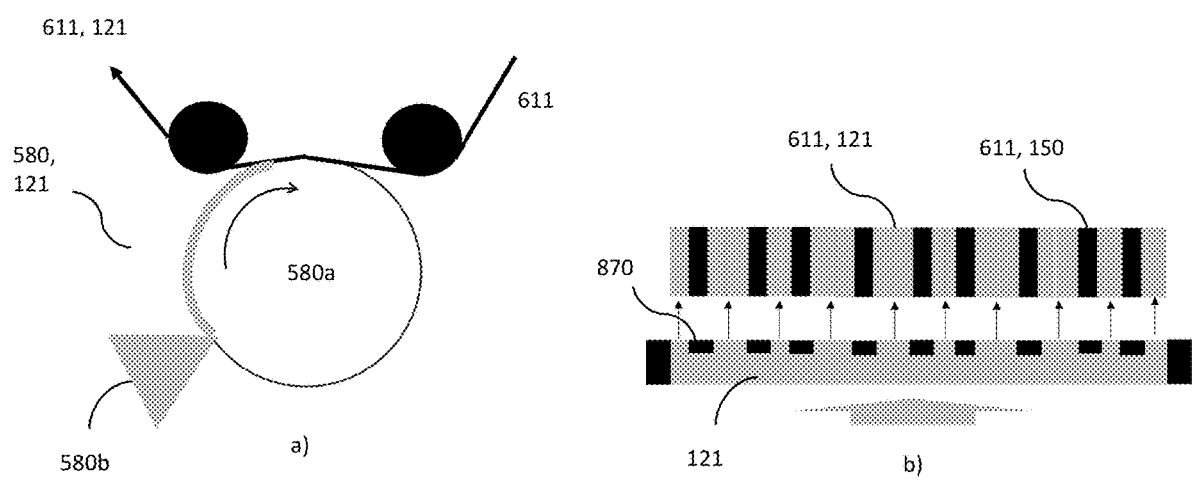
FIG. 8 illustrates, by way of an example, a detail of a manufacturing method and an apparatus according to an embodiment.

The adhesive coating layer 120, 121 may be a patterned coating layer as shown e.g. in FIGS. 6 to 8. By arranging adhesive coating 120, 121 in stripes in the longitudinal direction of the label web 100 (i.e. the first direction), performance of the linerless label web 100 in the on-demand printer as well as the manual handling of the label after printing may be significantly improved.

For some end uses, it may be essential to leave continuous adhesion-free areas/stripes 150a near the longitudinal edges of the label web 100. These adhesion-free areas/stripes 150, 150a near/on the longitudinal edges may correspond to minimum of 30%, or of 50% or even more than 70% of the total width of the label web 100. The rather wide non-adhesive area on the outer edges of the label prevent any bleeding of the adhesive in the label roll and aid keeping the printer mechanics clean. The adhesion-free may be arranged symmetrically or nearly symmetrically on both longitudinal edges of the label web 100. Thus, it may be possible to ease travel of the label inside the printer and/or to help to be able to grip the labels with fingers not touching the sticky PSA.

If the width of the adhesion-free areas 150 is selected to be non-symmetric, the narrower of these areas on either longitudinal edge of the label web 100 should correspond to minimum of 10%, 15%, 25% or even more than 35% of the total width of the label web 100.

For example, a single PSA stripe in the middle of the linerless label 200 ranging in width from 10 to 25 mm may provide good balance between tack and manual handling and most importantly, provides good long term performance in the compact, on-demand linerless printers. The rather wide non-adhesive area 150a on the outer edges of the label may prevent any bleeding of the adhesive in the label roll and aid keeping the printer mechanics clean. Yet, the PSA area is wide enough to provide good enough traction in the printer rolls in order to traction the label through the printer.

In an embodiment, in order to obtain at least some of the above-mentioned advantages, the adhesion-free areas/stripes 150, 150a near (or on) the longitudinal edges of the label web 100 may have a width in a range between 10 and 25 mm.

Surprisingly, a ratio between a coat weight expressed in $g/m^2$ and total width of the stripes in mm seems to follow approximately a linear relationship. For example, in a 57 mm wide label a single adhesive stripe of 17 mm may be used with 18 $g/m^2$ (dry) coat weight. If the adhesive stripe width would be increased to 34 mm, the (dry) coat weight would need to be reduced to order of 9 $g/m^2$. Such a low coat weight may not be preferable, as it may give raise to anchorage problems depending on how the adhesive is dried.

The alternating adhesive stripe positioning, width and/or the number between successive rolls may take place according to the total PSA coverage rules as described earlier and taking care that again the minimum non-adhesive area of 10% of the total width of the label web 100 is maintained on both of the cross-directional edges of the label.

Advantageously, the usage of the emulsified silicone additive in the adhesive coating 120, 121 is combined with the patterned adhesive coating layer. Thus, it is possible to obtain a linerless label (web) for on-demand linerless label printer in a cost-effective manner, which linerless label (web) may have improved properties for the on-demand printer as well as for the labelling purpose.

The modified adhesive coating 120 may be plasticizer-free. This may have several advantages as plasticizers may migrate into the product and cause some problems. For example, food safety might be compromised.

Thus, the novel linerless label (web) 100, 200 may have several advantages. The modified adhesive coating comprising silicone additive and PSA can be used on thermal papers (including economy grades) without issues of premature image development or image fade. Further, the linerless label (web) may remain fully removable from printed/over-lacquered surfaces. Still further, the linerless label (web)

100, 200 may have sufficient anchorage and resistance to paper-penetration so that priming is not required. Moreover, the linerless label (web) 100, 200 may have flat adhesion profile over extended dwell-time and sufficient cohesion to resist winging on curved surfaces.

Release Coating

The thermally printable face 110 may have a release coating 130 on the first side 111 of the face 110, i.e., top of the face 110, as illustrated in FIG. 1.

Later in this text an example is given of a drying process, wherein the adhesive coating 120, 121 is coated and dried directly on the face 110. Further, another example is described, wherein the adhesive coating 120, 121 is first coated and dried on a separate carrier and only then transferred onto the face 110. The benefit of the former method is having less manufacturing steps but on the other hand requiring arrangements not to overheat the thermally sensitive face material. The benefit of the latter is to be able to perform the drying phase more freely but on the other requiring additional processing steps to transfer the dried adhesive onto the face 110.

It should be understood that there are now several options in how and when the release coating 130 can be arranged on the first side of the face 110. These are described below together with some details of the release coating composition.

According to one embodiment, the release coating 130 is coated and cured on the top of the face 110 before either directly coating and drying the adhesive coating 120, 121 on the bottom of the face 110, or alternatively, before transferring the separately dried adhesive coating 120, 121 on the bottom of the face 110. In other words, in these embodiments a readily release coated face 110 is provided into the process of adding adhesive coating 120,121 on the opposite side of the face 110. The benefit of these embodiments is that the release coating 130 may be provided as a completely separate step and potentially in completely separate facility.

Thus, the method may comprise the following step:
supplying the face 110 comprising a direct thermal printable coating, and a release coating on the direct thermal printable coating.

According to another embodiment, the face 110 is first directly coated and dried to have the adhesive coating 120 on the bottom of the face 110, or alternatively, the separately dried adhesive coating 120 is first provided on the bottom of the face 110. In other words, in these embodiments the face 110 is first provided with the adhesive coating 120, 121 on the bottom of the face 110 and the release coating 130 is added afterwards on the opposite side of the face 110. The benefit of these embodiments is that the release coating 130 is not undergoing any previous processing steps helping to avoid release agent contamination during those steps. On the other hand, the release coating 130 needs to be added in the same process because otherwise the adhesive coated web cannot be self-wound into a roll.

Thus, the method may comprise the following steps:
supplying the face 110 comprising the direct thermal printable coating,
applying modified adhesive coating 121 comprising silicone additive and water-based acrylic adhesive on to a substrate wherein the amount of the silicone additive is in a range between 1 wt. % and 6 wt. %, preferably in a range between 1 wt. % and 3 wt. %, calculated from the total dry weight of the adhesive coating, and
thermally drying the modified adhesive coating 121 on the substrate into a pressure sensitive adhesive coating 120, wherein
a) said substrate is the second side 112 of the face, or
b) said substrate is a carrier material 611, 611a, 611b, and the method further comprises the following step:
transferring the pressure sensitive adhesive coating 120 from the carrier material on to the second side 112 of the face 110
wherein the method further comprises:
applying a release coating 130 on the direct thermal printable coating.

According to still another embodiment, the face 110 is pre-coated with a release coating 130 on the thermally printable top side. Then onto the same side and on top of release coating 130 the adhesive coating 120,121 is either directly coated and dried, or alternatively, the separately dried adhesive coating 120, 121 is transferred on top of this release coating 130. In these embodiments, when the web is self-wound into a roll the pressure sensitive adhesive coating 120 becomes anchored onto the bottom side of the face 110 which is now without release coating. When unwinding the roll such linerless web has the adhesive coating 120 remaining now on the bottom of face 110 and the release coating 130 remaining on top of the face 110. The benefit of this embodiment is that especially in the direct adhesive coating approach it allows the use of adhesive coating methods normally applicable in label industry. This is because other method of manufacturing linerless label (web) 100,200 is to coat and dry the pressure adhesive on the release coated liner and only then laminating the liner together with the label face material using this same pressure sensitive adhesive layer.

Thus, the method may comprise the following steps:
supplying the face 110 comprising the direct thermal printable coating, and a release coating 130 on the direct thermal printable coating,
applying modified adhesive coating 121 comprising silicone additive and water-based acrylic adhesive on to a substrate wherein the amount of the silicone additive is in a range between 1 wt. % and 6 wt. %, preferably in a range between 1 wt. % and 3 wt. %, calculated from the total dry weight of the modified adhesive coating, and
thermally drying the modified adhesive coating 121 on the substrate into a pressure sensitive adhesive coating 120, wherein said substrate
a) is the release coating 130, or
b) said substrate is a carrier material 611, 611a, 611b, and the method further comprises the following step:
transferring the pressure sensitive adhesive coating 120 from the carrier material on to the release coating 130.

The release coating may be UV curable silicon having the benefit of being curable on top of thermal face without heat.

The release coating 130 is only optional feature. Due to the modified adhesive coating 120, 121 comprising silicone additive and/or the surface properties of the printable face 110, the separate release coating 130 might not be needed. Thus, because the modified adhesive coating 120, 121 comprises silicone additive, the linerless label (web) 100, 200 may be release coating 130 free, if the adhesion of the face 110 is low enough so that the pressure sensitive adhesive can be readily released from the face 110 upon unwinding the linerless label product roll.

However, the separate release coating layer 130 may be used to further improve the self-woundability of the linerless label. The linerless label web 100 with pressure sensitive adhesive 120 on its one side (bottom side) and release coating 130 on its other side (top side) can be self-wound around itself without tendency of blocking the adjacent layers of the label web 100 to each other.

Thermal printing of the linerless label (web) 100, 200 may be made through this release coating 130.

The release coating 130 may be a silicone-based or non-silicone-based release coating. Preferably, the release coating comprises or consists of silicone-based release coating. PA silicone-based release coating 130 may comprise UV curable silicone, for example UV free radical silicone or cationic UV silicone. The release coating 130 may comprise one or more layers of release coating 130.

Non-thermally curable release coatings are preferable, for example UV curable silicone, because curing of such layers may not heat the thermally sensitive materials in the thermally direct printable face 110.

Thanks to the novel solution wherein the adhesive coating 120, 121 comprises adhesive and silicone additive, the adhesion may be low enough so that the adhesive layer can be readily released from the face material upon unwinding the linerless label product roll. This effect may be further improved if the adhesive coating layer has the adhesion-free areas 150.

A further function of the release coating 130 may be that it may provide a lower friction level against the print head of the on-demand printer and/or against other mechanical components of the on-demand printer minimizing wear of those components and minimizing adhesive residue built up. Thus, in an example, the release layer 130 is used in order to lower friction against the print head of the printer.

Therefore, in an advantageous embodiment, the face 110 may comprise a paper and a direct thermal coating, wherein top side of the face 110 is coated with a silicone-based release coating 130, and the another side of the face 110 is coated with the adhesive layer comprising adhesive and silicone.

Linerless Label

A label 200 (also called as a linerless label or a label product) is a piece of material to be applied onto an article. Articles of different shapes and materials may be used together with the labels 200. An article may be a package. Properties and requirements for a label 200 may be different depending on the end use in question as described in Table 1.

A label 200 comprises at least the face 110. A typical way to adhere the label 200 onto an article is by use of the PSA coating 120. Therefore, the adhesive coating 120 comprises pressure sensitive adhesive (PSA). A label 200 comprising pressure sensitive adhesive may be referred to as a pressure sensitive adhesive label. Pressure sensitive adhesive labels may also be referred to as self-adhesive labels.

The labels 200 comprising PSA can be adhered to most surfaces through an adhesive layer without the use of a secondary agent, such as a solvent, or heat to strengthen the bond. In that case, the adhesive is pressure sensitive as such. Alternatively, the adhesive may be activatable in order to be pressure sensitive. The PSA forms a bond when pressure is applied onto the label at ambient temperature (e.g. between 15 and 35° C.) or for cold applications even under freezing temperatures below 0° C., adhering the label to the item to be labelled. Examples of pressure sensitive adhesives include water-based (water-borne) PSAs, solvent based PSAs, and hot-melt PSAs. A label may, alternatively or in addition, comprise other adhesive(s).

In this application, the pressure sensitive adhesive is water-based acrylic PSA which has inherent pressure sensitivity without need for separate activation before being able to be dispensed onto an article to be labeled.

There are different kinds of labels in the market. A label may be so-called linerless label 200. The linerless label comprises a face 110 and an adhesive on the face 110. Alternatively, the label may be a so-called shrink label, where heat shrinkable polymeric face material(s) are seamed and rolled on or sleeved around labelled articles and shrunk around the items. Shrinkable labels may comprise additionally some pressure sensitive adhesive(s) or those may be produced completely without pressure sensitive adhesive, or even without seaming adhesive. Further, the label may be an activatable linerless label, wherein the adhesive is activatable to be pressure sensitive, using for example additional heat, moisture or other activation means.

In this application, the label is a linerless label which is attached onto the labelled item primarily via the pressure sensitive adhesive covering at least partially the bottom side of the label. The linerless label (web) of the invention is also of the tape-type, in other words it can be self-wound onto itself in a roll without need for additional release liner.

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s). One important subcategory of labels using direct thermal printable face materials are so-called Variable Information Print (VIP) labels. These labels are at least partly printed just before dispensing them onto the item to be labelled and carry product specific information on that individual item to be labelled. VIP labels are used, for example, in retail weighting scales for fruits, vegetables, meat and other items sold per weight. Other labels which are individually printed per need are different type logistic labels containing shipment or product specific information, bus or train tickets or other tickets etc.

Advantageously, the linerless label (web) 100, 200 comprises the face comprising silicone coating 130 on the first side 111 and silicone additive on the second side 112 of the face. Thus, an improved direct thermal linerless label may be formed, which may have improved properties.

In an advantageous example, the linerless label (web) consists of the direct thermal face having
 a release coating on the first side 111, and
 a water-based acrylic adhesive coating comprising silicone additive on the second side 112.

Linerless Label Web

FIG. 1 illustrates, by way of an example, an $S_x,S_y$-cross-section of a linerless label (web) 100, 200, which may be a linerless label web 100 or a single label 200.

A linerless label web 100 refers to structure comprising a continuous face 110 and an adhesive 120 arranged on one side of the face 110. A linerless label web 100 is generally processed by moving over rollers. Between processing stages, the label web 100 may be stored and transported as rolls. From the linerless label web 100, individual labels 200 may be cut.

Linerless Label Roll

The linerless label web 100, after rolled into a roll, may be referred to as a (linerless label) customer product roll, customer roll or product roll. Depending on a diameter of the label roll and thickness of the linerless label material, a single roll may contain, for example, 10-100 meters of label material (i.e., linerless label web 100).

Width of the linerless label web, before cutting into customer rolls, is typically a multiple of the final customer roll width. The width of the web, before it is cut into customer rolls, may be, for example, from 1 to 3 meters.

The face 110 may be arranged with multiple adhesive stripes in order to provide multiple individual label widths. Afterwards, the wider web width of the machine roll produced in this manufacturing process may be to be slit into a correct customer roll width, for example having a width of at least 10 mm, preferably from 20 to 100 mm.

A single machine roll may be arranged with different adhesive patterns in different cross-directional positions (adhesive stripe locations) and thus used to produce different type of customer rolls. The slitting process may be used further to provide different adhesive stripe positions. Quite commonly used widths can be found around in the middle of the aforementioned range, i.e. between 40-60 millimeters.

Typical linerless label web 100 customer roll consisting of a single label width may have a width of approximately 50 to 100 mm. Total PSA coverage in a cross-direction, i.e. the second direction, of a label web 100 may be less than 70%, or less than 50% or even less than 30%. PSA may be arranged in one or more stripes in the cross-direction of the label web 100 leaving one or more adhesion-free area(s) 150 between the PSA stripes continuous in the longitudinal direction.

On the other hand, according to one embodiment the label may be almost fully covered with adhesive leaving only 1-3 mm areas along the longitudinal (machine direction) edges without adhesive to prevent oozing of the adhesive out from the sides of a label roll and/or aiding the manual gripping of the label from the edge without touching the sticky adhesive. The non-adhesive edges or other non-adhesive areas 150, 150*a* of the linerless label (web) 100, 200 also help to minimize building adhesive residue inside the printer or guillotine mechanisms.

In an embodiment, the linerless label (web) 100, 200 comprises adhesion-free edges 150*a*, which adhesion-free edges are adhesion free areas on the outer edges of the linerless label (web), the adhesion-free edges having a width in a range between 1 mm and 25 mm, more preferably in a range between 2 mm and 20 mm, and most preferably in a range between 5 mm and 15 mm.

The linerless label (web) 100, 200 may comprise at least one, preferably all properties from a group comprising:

- Thermal paper with static sensitivity below 90 degrees C., preferably below 80 degrees C. but however above 65 degrees C. This ensures that thermal printing can be performed with reasonably low energy levels and high speed in the thermal printer but at the same time prevents the thermal paper undergoing unwanted activation during manufacturing and logistics.
- No special primer between the thermal paper and PSA to enhance adhesive anchorage of the adhesive onto the thermal paper. High enough anchorage may be achieved by using high enough coat weight of the adhesive and fully drying the adhesive. This streamlines the manufacturing leaving out one additional processing phase and helping to lower the cost.
- Coat weight of adhesive layer 120 (comprising PSA and silicone additive) in the range of 15-20 $g/m^2$ (dry coat weight) in order ensure both; good anchorage to the thermal paper and good tack to different type of surfaces.
- Adhesive layer 120, 121 comprises acrylic based removable PSA and silicone additive which is UV silicone. Acrylic based adhesives are more environmentally friendly and also provide more suitable temporal build-up of the final tack helping to reduce contamination of the printer. UV silicone makes possible to cure release coating layer without activation of the thermal face.
- Adhesive layer 120, 121 is arranged in one or more stripes in the edge and/or middle part of the label web 100 in longitudinal direction. This ensures suitable label behavior per given end use but also helps to reduce the contamination of the printer.

Linerless Label Printers

The general properties of the on-demand compact printers are discussed to clarify the requirements for the label product.

In labelling process, the linerless label web 100 gets printed by a printer with variable information and guillotine cutter of the printer cuts the label web 100 to proper label length to be applied to product.

Labelling happens manually or automatically. Challenge in linerless label printers is adhesive accumulation to guillotine blade resulting shorter printer service cycle. In poorest case adhesive although perfect in application cannot be used as printer service cycle gets too short.

Figure 2:
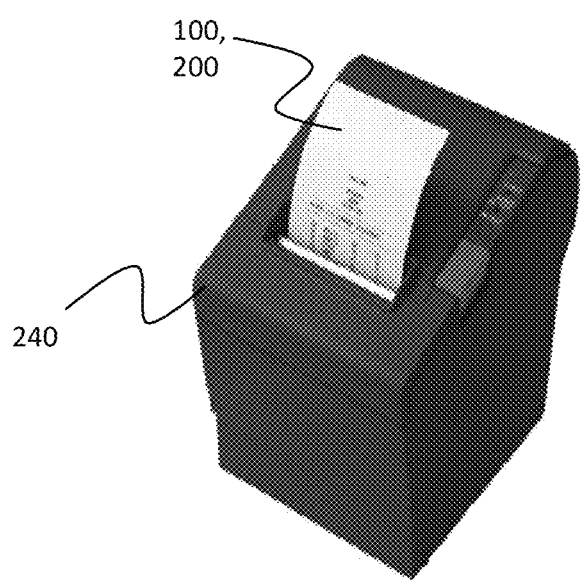
FIG. 2 illustrates, by way of an example, a schematic representation of a label printer useable with linerless label web according to the disclosure.
Figure 3:
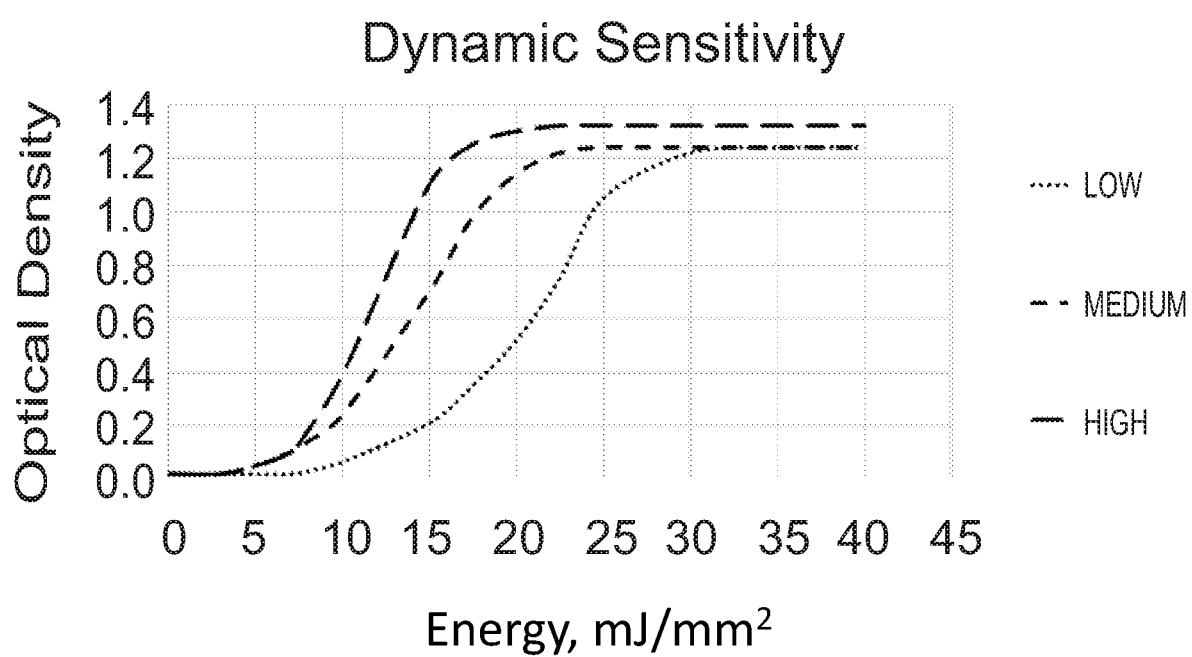
FIG. 3 illustrates, by way of an example, dynamic sensitivity behavior of low/medium/high categorized direct thermal papers.

FIG. 2 shows an example of a label printer 240 useable together with a linerless label web 100 according to this disclosure. The label printer 240 may be called as a linerless label printer or linerless printer. These terms refer to a printer that is arranged to print linerless labels. The label printer 240 may be referred to as an on-demand label printer to emphasize that the printer may be used for printing the labels individually per need.

Business environments wherein such on-demand label printers are used typically call for very compact size and ease of use of those printer devices with minimal need for servicing. Thanks to the direct thermal printable linerless labels, the linerless labels themselves carry the thermally sensitive printable coating. This deviates from other non-direct thermal printing methods utilizing, for example, separate thermal print ribbons that need to be loaded into the printers and replaced after use accordingly.

Further, the number of individual components is selected to have minimal complexity. Preferably, the printer is also made very simple to use and has, for example, minimal need for any settings and adjustments.

Main functional parts inside such a compact linerless label printer may comprise: a mechanism for conveying a label web 100 through the printer, a thermal print head for printing the individual labels onto the label web 100 and a mechanism for separating individual labels from the label web 100 and providing them for manual dispensing.

The mechanism for conveying the label web 100 starting from unwinding the web from the label roll through all various parts of the printer and finally outputting the individual labels is typically a series of guidance rolls and guidance surfaces. To minimize both the size and complexity of such a unit, most of the rolls are freely running and perhaps only one or only a few of them are motorized in order to traction the label web 100 forward during printing. These rolls or surfaces may not utilize any special friction lowering coatings for cost effective structure. The traction roll(s) may also comprise simple plastic or rubber roll without any special coating but solely with a surface roughened in order to ensure traction. Typically, a single printer model is also designed to accept different widths of label rolls using a simple adapter to center the roll with respect to the web trajectory. Such a simple yet effective and economical printer design places severe demands on the linerless label web 100 in order to ensure smooth operation in customer service-oriented work. Typical challenges are related to pressure sensitive label web 100 sticking inside the printer to its various components and preventing smooth forward traction of the label web 100, and/or accumulation of adhesive residue onto printer components in prolonged use leading to the aforementioned problems and requiring cleaning of the printer components.

The thermal print head in this type of compact printers is typically selected to use lower print energies, i.e. less thermal energy may be transferred into the thermo-sensitive layers of the linerless label web 100. This is preferable in applications wherein short-lived labels are to be printed in a simple and economical manner. Even if the print heads could be adjusted for higher energy levels or temperatures, it may be preferable to run them on lower settings in order to maximize the use life of the thermal head/printer. It may also be that if the linerless label requires higher activation, the printing speed needs to be lowered due to the performance limitations of the printer.

In order to print, the thermo-sensitive linerless label web 100 may be tractioned via a gap between the thermal head and a platen roller. The printer sends an electric current to the heating elements of the thermal head, which generate heat. The heat activates the thermo-sensitive coloring layer of the thermosensitive paper, which changes color to black where heated. Such a printing mechanism is known as a thermal printing system or direct thermal printing system. The heating elements are usually arranged as a line of small closely spaced dots. The printing energy (temperature and/or exposure time) may be adjustable, but such adjustments tend to be tedious and preferably a direct thermal printable label material should be selected in order to work without a need to fine tune the printer properties. If more printing energy is required, this typically means that the printing speed is slowed down allowing the printing temperature to affect the label for longer time and therefore transferring more energy to the web. Therefore, the performance of the print head has an effect on selection of the thermal face material of the linerless label product in order to ensure good quality printing even with lower print energy/heat levels and higher printing speed.

The mechanism arranged in the output side of the printer for separating individual printed labels from the continuous linerless label web 100 may comprise various types of electrically motorized cutting blades or guillotines or in many cases just simple non-movable serrated cutting blades. The latter requires the user to manually tear the label web 100 against the serrated or toothed blade. In any case, the user needs to manually grasp the printed label that has been offered out from the printer. When using a non-motorized or non-assisted cutting mechanism, the user needs to grip the label rather firmly to manually separate it from the continuous web. This again places requirements for the label material so that it will not unnecessarily stick to the cutting mechanism of the printer or the fingers of the user who needs to be able to conveniently position the label into its first labelling position.

In view of being used in such printers, the linerless label (web) 100, 200 according the invention uses water-based acrylic adhesive which further comprises silicon additive. Water-based acrylic adhesive provides less aggressive first tack meaning that after being opened from the label roll, the immediate tack of the PSA when guided through the printer is less aggressive compared, for example to hot melt-based PSAs. This helps, together with other features of the label, to minimize the adhesive residue build up inside the printer. The final tack builds up only after the label has been dispensed and left on the labelled item for a longer time. The label might even be removable over a certain period of time (minutes), before building a more permanent type of tack. Specific properties of PSA naturally depending on the exact formulation of the adhesive and surface materials to be labelled.

A linerless label product disclosed herein may be intended for end uses having a short label-life and requiring manual handling, repositionability and/or removability together with lean sustainable and economical structure.

For example, in fast food restaurants, as specific end use, the meal order may be first made either remotely via internet or locally in the restaurant via self-service touch-screen order kiosk or at the service desk. After the order and sales have been confirmed then one or more labels may be printed for the order. For example, at the drink station one or more labels may be printed for the drinks and attached onto the appropriate cups. In the kitchen, one or more labels may be printed for the various parts of the meal, for example for different burgers and other dishes or side-dishes. After the various dishes have been prepared and individually boxed or wrapped, then the appropriate labels may be individually attached to each of the dishes. If applicable and especially for a larger order, a compilation or summary label may also be printed and used to help to compile and check that all dishes included in the order have been prepared and included before delivering the order to the customer.

For another example, a luggage tag may be a label which is wrapped around the handle of a luggage, in this case typically around the handle of a takeaway or delivery bag. The luggage tag label adheres onto itself as loop around the handle leaving the sticky adhesive side facing inwards and printed side facing outwards. In a takeaway or delivery bag such a luggage tag can be thus used both as a sealing label as well as identification label during the transport or for the end user.

The linerless label according to the specification can be particularly suitable for using with on-demand linerless label printer. Thus, it may reduce the problems caused by the through cutting of said printers. i.e., linerless label to be cut by a blade of a linerless label printer. The novel solution may prevent an accumulation of the adhesive coating 120 to a blade of the linerless label printer, which may result shortened printer service cycle. Thanks to the novel solution wherein the modified adhesive coating layer comprises silicone additive, adhesive accumulation to the blade of the printer may be significantly reduced. Further, adhesive accumulation to platen roll and other parts of the linerless label printer may be significantly reduced.

Thus, there are multitude of requirements placed on the linerless label product in order to provide cost-efficient, efficient, and trouble-free operation in a user friendly and sustainable manner.

Manufacturing Methods
Patterned Adhesive Coating

As discussed, the adhesive coating 120, 121 may be patterned. Patterned adhesive refers to a situation wherein the adhesive covers less than 100% of the second side 112 of the face surface. For example, the adhesive may cover between 10% and 90% of the total area of the face 110. The adhesive may be arranged for example as stripes along longitudinal direction (i.e. the first direction) of the label web 100. Thus, in transversal direction (i.e. in second direction) of the label web 100 the face 110 may comprise alternating areas with and without adhesive and/or with and without adhesion.

The problem with the face 110 comprising thermal paper arises from heat sensitivity of the thermal paper. Thermal coating of a thermal paper is activated using heat. This may prevent drying and/or heating water-based adhesive on a thermal paper, since heating may lead to activation and the thermal paper becoming blackish or causing less severe but unwanted visual changes. The partly or fully activated brownish or blackish thermal paper surface prevents providing a high-quality visible print on it.

Even more severe problems may arise when only a part of the face 110 comprising the direct thermal paper is arranged to comprise the adhesive, thus leaving certain areas of the face 110 without adhesive. Those areas without the adhesive would be even more prone to activation of the thermal paper while drying and/or heating the adhesive. Some label applications call for such patterned adhesive, sometimes also referred as pattern gumming.

Arranging the adhesive in stripes in the longitudinal direction of the label web 100 may be essential in order to achieve necessary performance relating to certain end uses of the labels, such as with respect to on-demand printers and/or manual handling of the labels after printing. Arranging adhesion-free stripes/areas 150, 150*a* along longitudinal edges of the label and/or the label web 100 may be of help in manual handling and/or dispensing of the label. The person handling and/or dispensing the label is enabled to grab the label without having to touch the adhesion area, thus maintaining one's fingers clean of the adhesive. Further, arranging adhesion-free stripes/areas along longitudinal edges of the label web 100 is advantageous from the printer point of view, as said longitudinal edges may be the only parts of the label web 100 arranged to be in contact with the printer. Therefore, contamination of the printer parts by the adhesive may be avoided or at least diminished. Further, in a case the label web 100 contains more than one label width its slitting to label web 100 rolls having a single label width may be cleaner, as the slitting may be performed along the adhesion-free stripes/areas. Finally, from the economic and environmental point of view it is favorable to provide the label 200/label web 100 with the adhesive solely on parts of the label necessary for providing the desired adhesion.

Figure 4:
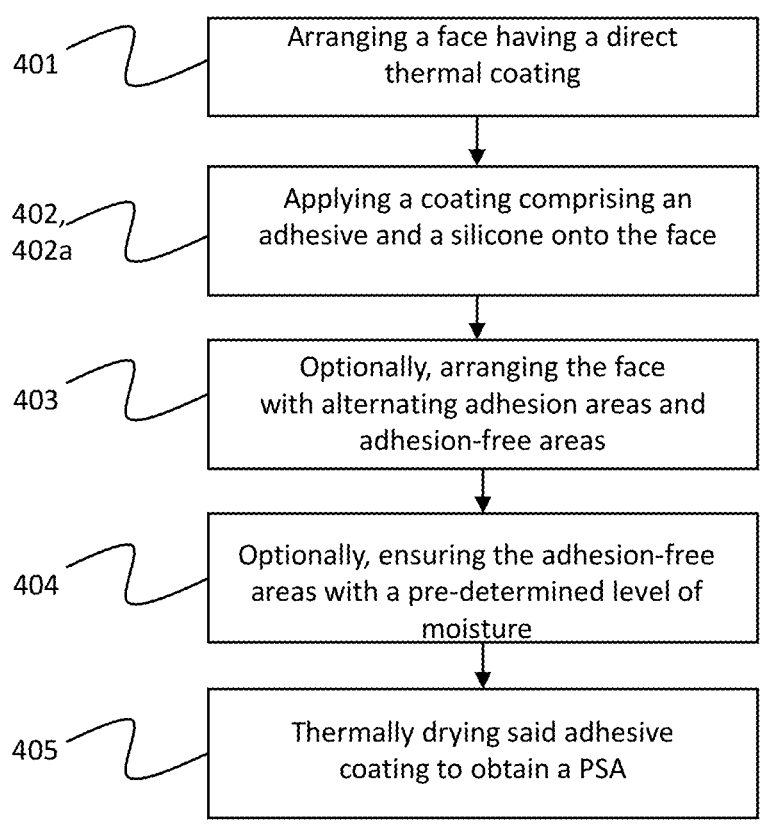
FIG. 4 illustrates, by way of an example, method steps according to an embodiment.

According to an embodiment and as illustrated in FIG. 4, a method for manufacturing a linerless label web 100 comprising a direct thermal printable coating and a patterned pressure sensitive adhesive is provided. The method comprises arranging a substrate comprising direct thermal printable coating as a face stock (step 401), applying modified adhesive coating 121 comprising silicone additive onto the face stock (step 402), providing the face stock with alternating adhesion areas and adhesion-free areas in a transversal direction of the face 110 (step 403), ensuring the adhesion-free areas 150 with a pre-determined level of moisture (step 404), and thermally drying the modified adhesive coating 121 into the pressure sensitive adhesive 120 (step 405). Step 404 may also refer to maintaining or arranging the adhesion-free areas 150 with moisture. Steps 402-404 of the method may be performed simultaneously or stepwise.

Figure 5:
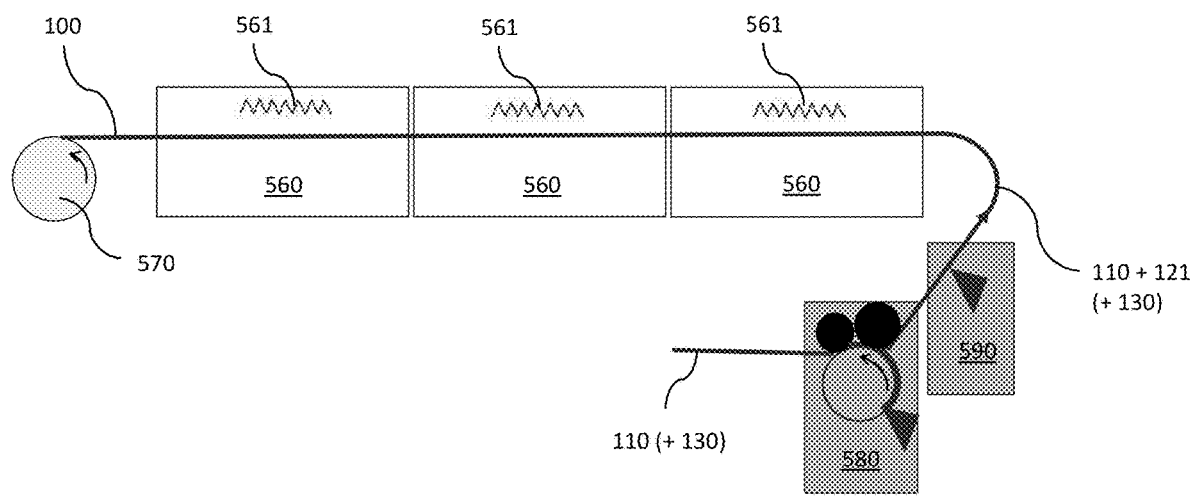
FIG. 5 illustrates, by way of an example, an embodiment of a manufacturing method and an apparatus.

FIG. 5 illustrates an apparatus according to an embodiment. The apparatus comprises a coating unit 580 for applying modified adhesive coating 121 onto a face 110. Downstream of the coating unit 580 the apparatus comprises a unit 590 for adhesive removal and/or for providing moisture. Downstream of the unit 590, the apparatus comprises at least one drying unit 560 for drying the modified adhesive coating 121. The drying unit comprises at least one drying device 561. After the drying unit(s) the thus formed linerless label web 100 is arranged to be rolled onto a linerless label web roll 570.

Ensuring the adhesion-free areas 150 (shown e.g. in FIG. 7) with a pre-determined level of moisture has the effect that when drying the adhesive the moisture will evaporate, which evaporation prevents temperature of the thermal paper from increasing to values that would cause activation of the thermal paper.

In an embodiment, the patterned adhesive is provided by first applying the modified adhesive coating 121 onto 100% area of the face 110 by the coating unit 580. After that some of the modified adhesive coating 121 is removed from the face 110 so as to provide the face 110 with alternating adhesion areas and adhesion-free areas 150 in the transversal direction of the face 110. Removing of the adhesive is performed before drying the adhesive in at least one drying unit 560. Removing of the adhesive may be performed by a unit 590. Adhesion areas may be called adhesive stripes. Adhesive removal, in order to provide the face 110 with adhesive stripes, may be called pattern gumming.

Applying the modified adhesive coating 121 onto 100% area of the face 110 provides the effect that also the areas wherefrom the adhesive is removed later on, will get moistened by the water contained by the adhesive. Thus, there may not be a need to arrange moisture separately onto the adhesion-free areas 150 of the face 110. When applying adhesive coating 121 onto full area of the face 110, water is absorbed into the face 110 and small amount of adhesive is remaining on the face 110 after pattern gumming, also on the areas wherefrom the adhesive has been removed. Residual amount of the adhesive on the adhesion-free area may be about 0.5-5.0 $g/m^2$, such as from 0.5 $g/m^2$ to 2 $g/m^2$, or from 2.0 $g/m^2$ to 5.0 $g/m^2$. The residual amount of the adhesive is anyway so small, that after drying it does not provide significant adhesion properties, and thus is called adhesion-free.

The modified adhesive coating 121 may be applied onto the face 110 using a contact coating method, such as a roll coating. The modified adhesive coating 121 may be applied by a direct gravure coating. In the direct gravure coating the adhesive transfer takes place directly from the gravure roll to the face 110. The adhesive may be removed from the face by a blade, such as a nylon blade. The blade may be called a pattern gumming blade or a doctor blade. The blade may refer to any means suitable for removing adhesive from a web. The blade has the effect that while removing the adhesive, the blade simultaneously provides pressure to the face 110, thus pushing moisture, i.e. water contained by the adhesive into the face 110. Dry weight content of the modified adhesive coating 121 that is removed from the web, i.e. the face 110, may differ from dry weight content of the modified adhesive coating 121 applied onto the face 110. The dry weight content of the modified adhesive coating 121 removed from the web may be from 0.1% to 5.0% lower compared to the dry weight content of the modified adhesive coating 121 applied onto the web. In an example, the dry weight content of the modified adhesive coating 121 removed from the web is from 0.5 to 1.0 lower compared to the dry weight content of the modified adhesive coating 121 applied onto the web. The residual amount of the modified adhesive coating 121 on the adhesion-free areas 150 together with the moisture transferred from the modified adhesive coating 121 to the face 110 have the effect that increase of the temperature of the thermal paper to values that would cause activation of it while drying the modified adhesive coating 121 may be prevented.

It should be noted that a certain coating thickness (coat weight) is needed in order to obtain the water-based PSA as a uniform, defect free layer on the face 110. Simply lowering the adhesive coating thickness under a certain value in an effort to facilitate drying at lower temperatures and without increasing the drying time will lead to unsatisfied PSA quality and performance. Therefore, the disclosure herein may also aim to provide means for using high enough coating thickness (coat weight) together with high enough drying temperatures in order to achieve good PSA quality and performance but yet to prevent overheating of the thermally sensitive coating.

In an embodiment, a certain target level of moisture is ensured to be present on all parts/areas of the linerless label web 100 before the web enters into the drying phase. During the drying phase, the evaporation of that moisture maintains the web temperature below the activation temperature of the thermal coating both in the areas without adhesive/adhesion as well as areas with water-based adhesive/adhesion.

FIG. 6 provides a detailed view of the method and the apparatus according to an embodiment. The modified adhesive coating 121 is applied onto 100% area of the face 110 by the coating unit 580. After that, some of the adhesive coating 121 is removed from the face 110 so as to provide the face 110 with alternating adhesion areas and adhesion-free areas 150 in the transversal direction of the face 110. A unit 690 is arranged to remove the adhesive coating 121 in order to provide the face 110 with adhesive stripes visualized as black blocks 121 in dashed enlargement of FIG. 6. The dashed enlargement illustrates the face having the adhesive coating thereon in Sx,Sz-plane. Grey droplets of FIG. 6 illustrate the adhesive coating removed from the face 110. Adhesive removed from the face 110 may be collected and returned back to the coating unit, as illustrated by the curved arrow between the unit 690 and the coating unit 580.

According to an embodiment, the pattern gumming blade is arranged at an angle of almost 90° with respect to the web, i.e. the face 110. The blade may be arranged at a wiping angle of from 75 to 85°, for example of 80°, with respect to the web. The blade may be arranged in forward direction with respect to the web. The web tension may be e.g. 100-250 N/m. The web tension may be, for example, 150 N/m. A higher web tension and/or a higher wiping blade angle may be responsible for providing pressure to the face 110, thus pushing more water contained by the adhesive coating 121 into the face 110 while removing the adhesive. Web tension and blade angle also have effect to the amount of the adhesive removed from the face 110. Higher web tension and/or blade angle may be responsible for higher amount of adhesive to be removed from the face 110.

Machine speed of the process may be, for example, 100-600 m/min. Distance between applying the modified adhesive coating 121 and removing the modified adhesive coating 121 may be for example from 50 cm to 5 m. Dwell time between applying the modified adhesive coating 121 and removing the modified adhesive coating 121 may be for example from 0.05 to 3 seconds. In an advantageous example, the machine speed of the process is in a range between 150 m/min and 250 m/min, and the distance between applying the modified adhesive coating 121 and removing the modified adhesive coating 121 is in a range between 60 cm and 90 cm. Thus, the dwell time between applying the modified adhesive coating 121 and removing the modified adhesive coating 121 is preferably between 0.1 and 0.5 seconds. The longer the distance between applying the modified adhesive coating 121 and removing the modified adhesive coating 121, i.e. the distance between the coating unit 580 and the unit 690 and/or the dwell time, the longer the time for the adhesive to be in contact with the face 110, and thus the higher the moisture content transferred from the adhesive coating 121 to the face 110.

Alternatively, the patterned adhesive may be provided applying the modified adhesive coating 121 only locally onto the face 110 so as to provide the face 110 with alternating adhesion areas 121 and adhesion-free areas 150 in the transversal direction of the face 110. This is illustrated in FIG. 7. The adhesion areas, i.e. the adhesive 121 stripes, are visualized as black blocks in FIG. 7. Thus, the face 110 is pattern coated with the modified adhesive coating 121. In order to prevent activation of the thermal paper while drying the adhesive, moisture is provided onto the adhesion-free areas 150, 150a of the face 110 prior to drying of the modified adhesive coating 121 into the pressure sensitive adhesive 120. Moisture may be provided by a unit 590, the unit 590 in this case being a water sprayer. The water sprayer is arranged to provide a water spray solely on the adhesion-free areas 150, 150a as illustrated by the grey, broad arrows in FIG. 7. In this embodiment, the adhesion-free areas 150, 150a may also be called adhesive-free areas.

As illustrated in dashed enlargements of FIG. 7, the adhesive coating 121 is coated onto the face 110 in continuous, parallel stripes running in machine direction, i.e. in longitudinal direction of the label web 100. The adhesive may be coated using a contact coating method, such as roll coating, wherein the adhesive is coated onto a transfer roll using a nozzle. The nozzle may be arranged with blocking shims (seen as blocks filled with slanted lines in FIG. 7) allowing the adhesive coating 121 to be delivered only onto certain cross-directional positions on the transfer roll. Therefore, the adhesive coating 121 on the face 110 also becomes patterned. The adhesive pattern may be changed per need by adjusting or changing the blocking shims in the nozzle.

In FIG. 8, a transfer roll 580a of a coating unit 580 is coated with an adhesive 120 using a coating nozzle 580b. The adhesive 120 from the transfer roll 580a surface is picked up onto the carrier web 611 forming adhesive coated carrier 611.

For pattern gumming, the coating nozzle 580b may be arranged with blocking shims 870 allowing adhesive to the delivered only on certain cross-directional positions of the transfer roll 580a. Therefore, the adhesive coating 121 on the carrier 611 becomes also patterned. The adhesive pattern may be changed per need by adjusting or changing the blocking shims 870 in the nozzle 580b It is to be understood that the pre-determined level of moisture depends on the drying temperatures and the target level for the moisture is to be selected such that during drying the evaporation of the moisture maintains the temperature of the thermal sensitive coating, i.e. the direct thermal printable coating below its activation temperature. The critical indication for this temperature is the exit temperature of the label web 100 when exiting the drying phase. If the adhesive is dried before it is transferred on the second side 112 of the face 110, said additional moisture may not be needed at all.

An Example of a Drying Step

Direct thermal printable coating of the label face substrate has traditionally prevented utilizing water-based adhesives with linerless labels. Such adhesives are typically dried in order to evaporate water after the adhesive has been applied onto a face 110 of a label. Use of water-based adhesive necessitates drying, while any heat sensitive layer or part of a label may prohibit drying or heating close or above the activation temperature of the heat sensitive layer. Drying with lower temperatures and lower coat weight (i.e. with less mass to be dried) may be possible, but without very careful selection of drying process parameters would in turn cause at least ineffectiveness and longer drying times and/or dimensions (length) of the drying chamber or oven.

A low coat weight may have a negative effect on PSA adhesion on labelled surface. Especially, if good adhesion and at the same time removability and/or repositionability is required, these call for higher coat weight of the PSA and this is especially emphasized in case of water-based adhesives. Further, if the adhesive is to be dried at lower temperatures because of the sensitive thermal coating extra care needs to be taken that the adhesive becomes fully dried and achieves optimal pressure sensitive adhesion performance.

The modified adhesive coating 121 may be dried on the face 110 or on the carrier 611.

As a result of the drying, the pressure sensitive adhesive 120 is obtained. The adhesive 121 is dried in order to evaporate water from the water-based adhesive. Drying comprises heating. Heating may be implemented by at least one of the following: infrared heating, microwave heating or air blow. Selection of the heating method affects the balance between radiative and convective heat transfer onto the web and pressure sensitive. Thus, the adhesive 121 may be dried into the PSA by using at least one of the following: infrared energy, microwave energy or air blow. Preferably the adhesive 121 is dried by air blow or by air blow together with another type of drying. Another type of drying may comprise infrared energy and/or microwave energy. This ensures suitable level of pre-heating of the adhesive to start the evaporation of the moisture from the adhesive but preventing the skinning of the adhesive top surface that would block the moisture from escaping out deeper from the adhesive layer.

The drying phase of the machine comprising the drying unit(s) may have a total length of between 20 and 30 meters.

The modified adhesive coating 121 may be dried in at least one drying unit 560.

An Example of a Drying Process, Wherein the Modified Adhesive Coating is Dried on the Face If the modified adhesive coating 121 is dried on the face 110, the drying unit 560 may have a temperature of between 60 and 90 degrees C. or in some cases even higher up to and above 100 degrees C. Preferably the drying temperature is at least 75 degrees C. in order to ensure that the water-based adhesive becomes fully dried and provides maximum adhesive performance such as adhesion. The drying temperature, i.e. the temperature of the drying unit(s) may be adjusted according to the adhesive and/or the face 110 in question. If more than one drying unit is used, temperature of each of the drying units may be arranged to be same or differ from each other. The face 110 comprising the modified adhesive coating 121 thereon may be arranged to proceed through the drying unit 560. Thus, a linerless label web 100 is formed.

At a point where the face 110 having the adhesive thereon exits the drying unit 560, temperature of the adhesion-free area of the face 110 may be for example 75 degrees C. Temperature of the adhesion-free areas 150 of the face 110 may be arranged to be below 80 degrees C. throughout the manufacturing process. This may be achieved by for example by arranging enough moisture on the adhesion-free area(s) 150 of the face 110 before drying the adhesive and/or adjusting the temperature of the drying unit(s) and/or adjusting the machine speed of the process and/or adjusting the distance and/or the dwell time between applying the adhesive and removing the adhesive.

Temperature of the linerless label web 100 when exiting thermal drying may be arranged to be from 5 to 15 degrees C. below an activation temperature of the direct thermal printable coating. Additionally, or alternatively, the modified adhesive coating may be dried at a temperature that is at least 10 degrees C. higher than the temperature of the linerless label web 100 when exiting thermal drying. In other words, the drying temperature may be at least 10 degrees C. higher than the temperature of the linerless label web 100 when exiting thermal drying, but from 5 to 15 degrees C. below an activation temperature of the direct thermal printable coating. From economical point of view, it may be preferable to arrange the temperature of the linerless label web 100 when exiting thermal drying to be as close to the activation temperature of the direct thermal printable coating as possible. Drying window may be made longer by providing extra moisture with water spray.

After drying of the adhesive, the face 110 with the pressure sensitive adhesive thereon, i.e. the linerless label web 100 is wound onto a roll 570 of linerless label web 100.

An Example of a Drying Process, Wherein the Modified Adhesive Coating is Dried on a Carrier Material Adhesive applied on a face 110 comprising paper may penetrate onto the face 110 and soften the face 110 or weaken hydrogen bonds in it. Thus, the paper face 110 may lose its qualities, which in turn may prevent further steps of label processing, like printing or die-cutting. In case of a plastic face 110, drying water-based adhesive applied on a face 110 has not been possible or has posed problems. For example, polypropylene or polyethylene have not been suitable label face 110 materials with a water based adhesive due to the high temperatures required in drying section which may cause melting or deformation of these filmic materials. The challenges are even more severe with thinner plastic film thicknesses which are a trend in order to save material and improve sustainability via lesser use of plastic materials.

According to an embodiment, the adhesive for the linerless label web is dried separately on a carrier material 611, before attaching the adhesive onto a face of the label. This avoids problems arising from heat sensitivity and enables usage of environmentally friendly water-based adhesives in such linerless labels. This approach allows a wider selection of substrate materials for the labels including substrate or coating materials even with lower physical or chemical performance but still fully valid for on-demand linerless printing and short-lived label applications. It should be understood that such label products do not need to be designed for the normal converting steps (printing, die-cutting, perforating, potential waste matrix removal etc.), but can be after manufacturing and slitting into customer rolls simply printed and manually dispensed for their final use. For such use, even lower grade and more economical materials can be used as the adhesive is separately dried using a separate carrier material 611, such as a metal belt or a web.

Figure 9:
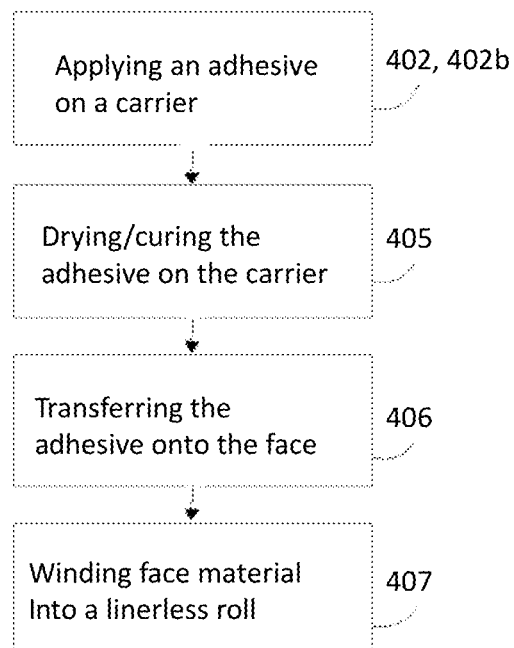
FIG. 9 illustrates, by way of an example, method steps according to an embodiment.

FIG. 9 illustrates a method according to an embodiment. This method allows applying a PSA comprising silicone additive on a sensitive linerless face and forming a linerless label web 100 without exposing the face 110 to temperatures exceeding the activation temperature of the direct thermal coating material(s). Steps 402-407 may also be called phases or stages.

It should also be understood that the adhesive coating methods explained earlier in this specification are also applicable in the following embodiments.

Water-based adhesive is used in the following embodiments. A solvent based adhesive or a hot melt adhesive would require some changes in the details of the adhesive coating techniques when the adhesive is first applied onto a carrier used for drying/curing the adhesive. Further, use of other adhesive types to achieve PSA might cause some changes in the drying and/or curing of the adhesive on the carrier material. However, the PSA is water-based acrylic adhesive for reasons discussed in this specification.

The modified adhesive coating 121 is in the first step 402b applied on a carrier material 611. Then, in the second step 405, the modified adhesive coating 121 is dried/cured into PSA 120 on the carrier material 611 by conveying the carrier through a drier. The dried water-based adhesive 120 is transferred onto a face 110 of a label web 100 in the third step 406. Finally, the face with the pressure sensitive adhesive is wound into a roll of a linerless label web 100 in the fourth step 407. In this embodiment, the drying/curing of the adhesive coating 121 takes place on a separate carrier material 611 and therefore the thermally sensitive coating(s) of the face are not exposed to temperatures exceeding the activation temperature of said he thermally sensitive coating.

In the following, two alternative approaches for the manufacturing method are described in more detail referring to FIGS. 10 and 11. The main difference between these two methods is how the carrier material 611 used for drying the adhesive coating is arranged. According to an embodiment schematically described in FIG. 10, the carrier material is arranged to be an endless belt. According to another embodiment schematically described in FIG. 11, the carrier material is arranged to be a reusable batch of a web material.

The carrier material 611 may be a belt 611a, for example a silicone belt, a plastic belt, such as a nylon belt, or a metal belt, such as a steel belt.

The carrier material 611 may be a batch of a web material 611a, wherein the carrier material 611, 611b may be a filmic web material, preferably a polyethylene terephthalate (PET) web or other thin filmic material tolerating the drying temperatures.

For the purpose of this specification, in the following the terms "carrier" and "carrier material" may refer either to an endless belt or to a batch of a web material.

The carrier 611 may comprise at least one release coating. The carrier may comprise a single release coating layer, or a multilayer release coating. The release coating of the carrier 611 may have effect of increasing release effect of the carrier. The release coating on the carrier 611 may enable to easily release the adhesive from the carrier 611. The modified adhesive coating 121 may be dried and/or cured into PSA 120 before detaching the PSA coating 120 from the carrier. The adhesive 120 is detached from the carrier 611 in order to apply and attach the adhesive on a face 110 of the label. The adhesive coating 120, 121 may comprise a single adhesive layer or multilayer of adhesive.

Thus, in this embodiment, the adhesive is dried on the carrier 611. The modified adhesive coating 121 on a carrier 611 may be dried in order to evaporate water from the water-based adhesive. The modified adhesive coating 121 may be dried on one or both sides of the carrier, i.e. above and/or under the carrier.

The modified adhesive coating 121 may be dried directly and/or indirectly. Drying may be implemented indirectly by heating the carrier.

Drying may comprise heating. Heating may be implemented by at least one or more of induction heating, infrared heating, air blow or microwave heating. Thus, drying may comprise utilizing air blow. Drying may comprise utilizing air blow and another type of drying. Another type of drying may comprise infrared energy and/or induction energy.

The dried adhesive coating 120 is applied onto a face 110. As discussed above, the face 110 may comprise a single layer or multiple layers, and the face 110 may comprise plastic and/or paper. The label web comprising the face 110 and the adhesive can be wound up onto a roll 570 with a winder 770.

Figure 10:
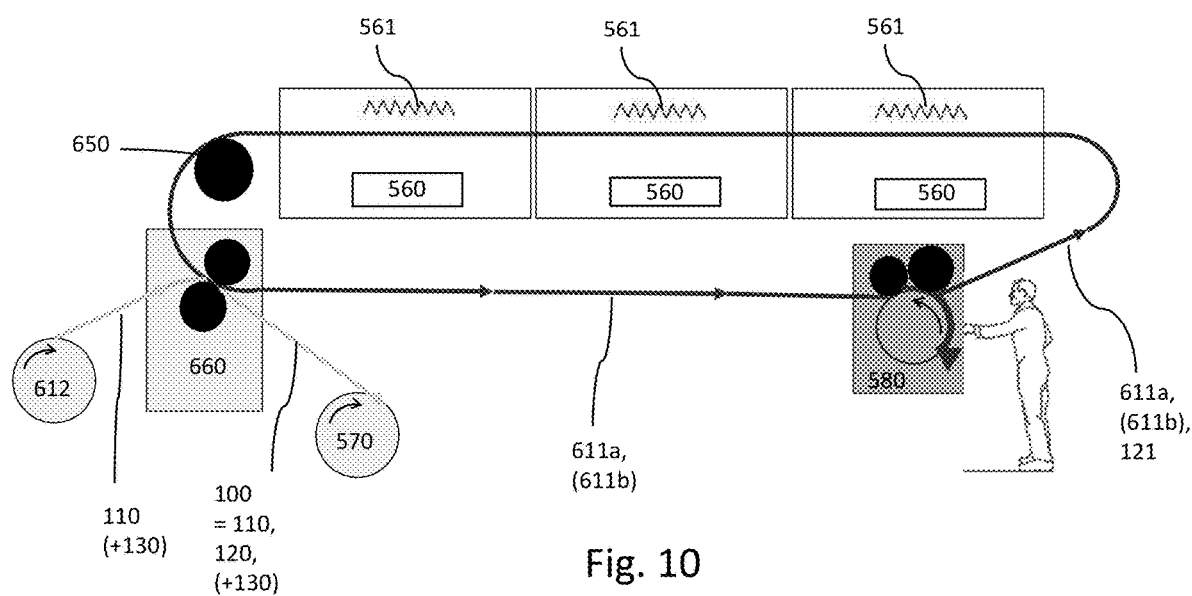
FIG. 10 illustrates, by way of an example, an embodiment of a manufacturing method and an apparatus.

FIG. 10 illustrates an apparatus according to an embodiment. The apparatus comprises a carrier material 611 in a form of a belt 611a. The adhesive 121 is applied onto the belt 611a by a coating unit 580. The coating unit 580 is arranged to apply the adhesive 121 onto the belt. The adhesive preferably comprises water-based acrylic adhesive and silicone additive.

In this embodiment, the coating step may comprise e.g. roll coating, curtain coating, foam coating or spray coating. The coating step may comprise a multilayer coating method. At least one adhesive layer comprising water-based adhesive and silicone additive may be applied onto the carrier material 611 by a contact coating method, preferably by a roll coating method.

In FIG. 10, the adhesive comprising the water-based adhesive and the silicone additive is dried on a belt 611a in order to evaporate water from the water-based adhesive. Drying may be implemented by one or more drying device(s) 560, 561.

The apparatus of the FIG. 10 may comprise means for direct drying of the adhesive on the belt 611. The apparatus may comprise means for indirect drying of the adhesive coating 121 on the belt 611. The apparatus may comprise both direct and indirect drying means. Indirect drying means may comprise means for heating the belt.

A drying device may utilize induction energy, infrared energy, microwave energy or air blow, for example. A drying device may comprise an induction heating device, an infrared heating device, a microwave heating device, or an air dryer. Infrared heating device and/or induction heating device may be situated under the belt 611, or on a side of the belt opposite to the side of the belt on which the water-based adhesive is applied. Air dryer or air jets may be arranged above the belt 611, or on a side of the belt onto which the water-based adhesive is applied.

The apparatus in FIG. 10 comprises an unwinder 612 for the face 110. The face 110 may be in form of a web wound to a roll. The face 110 may be unwound from the roll. After dried, the adhesive 120 may be attached to the face 110. The unwound face 110 and the dried water-based adhesive on the belt 611 can be attached in a nip 660, thereby forming a linerless label web 100. The formed linerless label web 100 is wound up to a roll 570. The label web roll 570 may be stored and/or transported for later processing. Label web roll 570 may be further processed in other location.

The apparatus of the FIG. 10 may further comprise a cooling cylinder 650. The cooling cylinder may be situated before the point wherein the dried water based adhesive layer is attached to the face 110. Speeds of the rolls in the apparatus of the FIG. 10 may be substantially the same in order to avoid damaging the face 110, for example stretching of a plastic face 110 or tearing of a paper face 110. Speed difference between the rolls of the apparatus is preferably less than 0.5%.

The belt 611a may comprise silicone, plastic, for example nylon, or metal, for example steel. The belt may be solid and/or non-porous and/or nonpermeable.

The belt 611a is preferably non-permeable to adhesive. Adhesive may not penetrate to belt material. The belt may comprise a closed surface. An external surface of the belt may comprise roughness of 0.2-3.0 μm, preferably 0.4-1.0 μm, according to PPS 10 of ISO 8791. The belt 611a may comprise at least one release coating. The release coating has effect of increasing the release effects of the belt. The release coating may comprise at least one or multiple release coating layers. The release coating may comprise at least one silicone coating layer or at least one fluoropolymer-based coating layer, for example polytetrafluoroethylene (PTFE) coating layer and/or fluorinated ethylene propylene (FEP) coating layer and/or perfluoroalkoxy (PFA) coating layer. The release coating may be non-permeable to adhesive.

Length of the belt and/or speed of the belt and/or temperature of the belt may be controllable. The belt length, speed and/or temperature may influence the drying process of the water-based adhesive on the belt. The length of the belt may be at least 10 m, or at least 20 m, and not greater than 50 m or 40 m, or not greater than 35 m or 30 m. The speed of the belt may be 200-1200 m/min. Drying temperature of the water-based adhesive on a belt may be 80-85 degrees C. or even higher. Preferably the drying temperature is at least 75 degrees C. to ensure that the water-based adhesive becomes fully dried and provides maximum adhesive performance such as adhesion.

The at least one adhesive layer may be in contact with the belt for at least 1 s, or 1.5 s, preferably at least 1.8 s, or at least 2.0 s, and preferably no longer than 10-20 s, and most preferably not longer than 8 s, to ensure efficient manufacturing. Thickness of a metal belt may be for example 0.2-4.0 mm, preferably 1-2 mm. The density of the metal belt at the temperature of 20 degrees C. may be 7500-8500 kg/m$^2$, preferably 7700-8050 kg/m$^2$ to ensure high enough heat capacity for efficient thermal transfer and heating. Roughness of the belt coating may be 0.2-3.0 μm, preferably 0.4-1.0 μm, according to PPS 10 of ISO 8791. The thermal conductivity of the metal belt at the temperature of 20 degrees C. may be for example 13-21 W/mK, or 14-15 W/mK. The thermal conductivity of the metal belt at the temperature of 100 degrees C. may be for example 14-22 W/mK, or 15-16 W/mK.

Temperature of a belt during the drying process is dependent on adhesive. Temperature may be adjusted according to the adhesive. For example, temperature of the belt may be at most 50-65 degrees C. or at most 70-80 degrees C.; or the temperature of the belt may be at least 75 degrees C., and not higher than 125 degrees C., or 120 degrees C., preferably no higher than 115 degrees C. Speed of the belt may be at least 280 m/min, more preferably at least 200 m/min, or at least 300 m/min, most preferably at least 350 m/min, or at least 370 m/min.

As discussed above, the dryer or drying device(s) 560, 561 arranged to evaporate water from the water-based adhesive may comprise an induction energy dryer, an infrared energy dryer, a microwave energy dryer, or an air dryer. Other dryers or drying means are possible and may be utilized. A dryer or a drying device may dry, for example by heating, the modified adhesive coating directly or indirectly. The modified adhesive coating may be dried directly. In addition, or alternatively, drying means may be arranged to heat the belt and conduct or transfer the heat via the belt to the modified adhesive coating on the belt. The modified adhesive coating is thus dried (or heated) indirectly, though the belt. This may improve the effectiveness of the drying process. Heating the belt may be implemented at least partly with induction heating or infrared heating. Drying has effect of removing moisture from the water-based adhesive coating on a belt.

In embodiments, wherein a metal belt is used, the modified adhesive coating 121 may be dried from a first side or both sides of the metal belt. The first side may be the belt side, so that the modified adhesive coating is heated via the belt. In these embodiments induction energy or infrared energy may be utilized. Infrared energy may be gas infrared energy or electrical infrared energy. Alternatively, or in addition the modified adhesive coating may be dried from the second side of the metal belt. The second side refers to the belt side, onto which the modified adhesive coating is applied. On the second side, for example infrared energy or air blow may be utilized. Microwave energy may be utilized on the side of the belt, to which the modified adhesive coating is applied. Microwave energy may be used to dry the modified adhesive coating on a belt directly. In addition, or alternatively, air blow may be used to dry and/or remove moisture from said at least one modified adhesive coating. Both direct and indirect drying of modified adhesive coating may enable having a desired temperature profile in relation to drying time. This may have effect of saving time and energy during drying of the water-based adhesive coating.

The induction energy may be utilized for drying. Induction drying may comprise a high frequency electrical heating. It may enable targeted drying or heating of the modified adhesive coating. An electrically conducting belt, for example a metal belt, may be heated by induction. Heat may be induced to the belt by circulating electrical currents. The frequency of an electromagnetic field used for heating may depend at least partly on belt size, belt material, coupling efficiency and electromagnetic field penetration depth. The induction heating may provide efficient combination of speed, consistency, and control. Induction heating may provide repeatable and controllable heating process. The induction heating process may be controlled for example by choice of induction frequency, power density and interaction time. The induction heating may provide very accurate temperature control, which enables maximizing the used temperature with low tolerance. Higher temperature may speed up the drying process significantly. Adhesive performance of the water-based adhesive coating may be improved due to less if any skinning of the adhesive during drying, compared to direct or sole direct drying. Since the belt is heated instead of ambient air or air only, energy used during drying process may be significantly decreased.

An infrared energy process may comprise an infrared gas heating process. The infrared gas heating device may use, for example, natural gas or propane as fuel gas. The infrared heating may be used instead or together with the induction heating. The infrared heating may be used instead or together with air blow. The infrared heater transfers energy through electromagnetic radiation. The infrared heater may dry the modified adhesive coating both directly and indirectly. The efficiency of the infrared heater may depend on matching the emitted wavelength and the absorption spectrum of the material or substance to be dried. The wavelength used for infrared heating comprises medium wave infrared range, for example 2-4 micrometers.

Air blow or air jets may be used to remove moisture from the water-based adhesive coating. The air jets are preferably placed on, or directed towards, the side of the belt, on which the at least one modified adhesive coating is applied.

In an example, the belt 611a comprises or consists of a web material.

Figure 11:
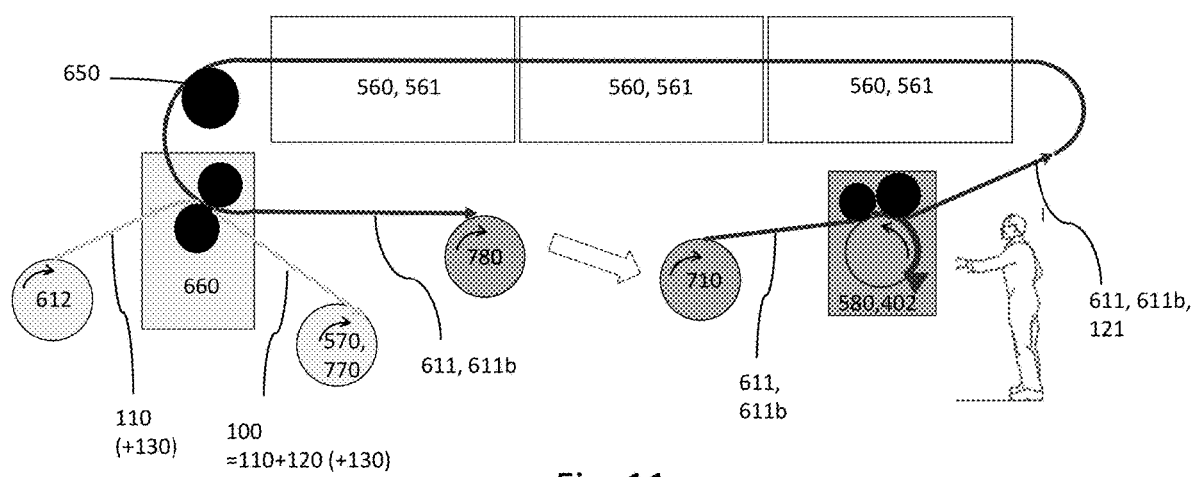
FIG. 11 illustrates, by way of an example, an embodiment of a manufacturing method and an apparatus, The figures are schematic and are intended to illustrate the general principles of the disclosed solution. Therefore, the illustrations in the Figures are not necessarily in scale or suggestive of precise layout of system components.

FIG. 11 illustrates schematically an alternative manufacturing method and an apparatus according to an embodiment. In this case, instead of an endless belt, the carrier 611 is arranged to be a reusable batch of a web material 611b. This allows to run predetermined lengths of production as batches and reuse the carrier material several times.

The benefits of this approach include, but are not limited to, possibility to use existing liner materials, for example siliconized PET liner as carrier. Drying temperature of the modified adhesive coating on the carrier, for example on a siliconized PET liner, may be 80-85 degrees C. or even higher. Preferably the drying temperature is at least 75 degrees C. to ensure that the water-based adhesive coating becomes fully dried and provides maximum adhesive performance such as adhesion.

In FIG. 11 the carrier 611, 611b is unwound at carrier unwinder 710 and guided to an adhesive coating station 580. The carrier is preferably a pre-siliconized carrier. The carrier 611b is forwarded through a drier or series of driers 560, 561. The face 110 is unwound at face unwinder 612 and in order to meet the carrier 611 in a nip arrangement 660 wherein the PSA 120 from the carrier 611 is transferred onto the face 110. After this transfer the face 110 together with the PSA 120 is rewound onto a machine roll using a linerless winder 770. The used carrier material 611, 611b wherefrom the PSA 120 has been removed is guided to a carrier rewinder 780. The carrier material is reusable and may be transferred back to unwinder 710 for reuse.

Because the typical length of the linerless label web in customer rolls may be 20-100 meters, for example 40 meters, this makes the use of reusable carrier 611 for adhesive preparation viable. A single roll or batch of the carrier 611b can be used to produce linerless label web 100 for one or even several lengths required in customer rolls 570. For example, a single roll of the carrier material 611b may have a length of 1000 m or more. This allows to run a batch corresponding to 10×100 m of customer roll lengths.

The apparatus of the FIG. 11 may further comprise a cooling cylinder 650. The cooling cylinder may be situated before the point wherein the dried water-based adhesive (PSA) comprising the silicone additive is attached to the face 110. Similarly as in case of FIG. 10, the speed of the rolls in the apparatus of the FIG. 11 may be substantially the same in order to avoid damaging the face web, for example stretching of a plastic face 110 or tearing of a paper face 110. Speed difference between the rolls of the apparatus is preferably less than 0.5%.

It should be understood that all heating/drying/curing methods explained earlier with respect to the endless belt embodiment in FIG. 10 are also applicable herein if they are suitable for the reusable batch carrier selected to be used.

According to an embodiment, a carrier in a form of batch carrier may comprise pre-siliconized PET with at least one, preferably all of the following properties:

PET film thickness ranging from 30-150 μm; strong enough to endure the physical stresses during use as a carrier,
non-shrinking at the temperatures used during drying,
pre-coated with a fully crosslinked release coating, for example silicone-based release material,
optionally, thermal or UV silicone coating.

It should also be understood that all adhesive coating methods explained earlier in this specification are also applicable herein. A preferable coating method is a transfer roll coating method explained in more detail with respect to FIGS. 5 to 8.

Thus, as disclosed in this application, the modified adhesive coating 121 may be arranged to be pattern coated in order to provide pattern gumming. This means that the adhesive coating can be coated onto the carrier material 611, 611a, 611b in continuous parallel stripes running in machine direction, i.e. in longitudinal direction of the carrier. The width of the carrier material is typically a multiple of the final customer roll width. The width of the carrier 611, 611a, 611b may range, for example, from 1 to 3 meters. Therefore, the carrier 611, 611a, 611b may be coated with multiple adhesive stripes in order to provide multiple individual label widths. Later the wider web width of the machine roll produced in this manufacturing process is to be slit into a correct customer roll width, for example having a width of 20-100 mm. A single machine roll may be coated using different adhesive patterns in different cross-directional positions (adhesive stripe locations) and thus used to produce different type of customer rolls. The slitting process may be used further to provide different adhesive stripe positions.

Pattern gumming may be obtained e.g. by using any of the above discussed methods. The pattern gumming may be obtained by using a contact coating method, such as roll coating, wherein the adhesive is coated onto a transfer roll using a nozzle. The nozzle may be arranged with blocking shims allowing the adhesive to be delivered only onto certain cross-directional positions on the transfer roll. Therefore, the adhesive coating on the carrier becomes also patterned. The adhesive pattern may be changed per need by adjusting or changing the blocking shims in the nozzle.

Referring back to FIG. 4 in view of FIGS. 5-8, it is possible that steps 401-405 may take place in various order. Further, referring back to FIG. 9 in view of 10 to 11, it is possible that steps 402 to 407 may take place in various order.

For example, for patterned adhesive coating, and as already explained, the amount of moisture meeting the pre-determined level of moisture may be achieved when the water-based adhesive is coated onto the label web and partly removed via blading before entering drying 405. It is also possible that areas wherefrom the adhesive have been removed or which areas have been left completely without adhesive in the first place are arranged with pre-determined level of moisture either before and/or after the adhesive coating but however before entering drying 405. It is also possible that even the areas provided with adhesive coating are provided with additional moisture either before and/or after the adhesive coating but again before entering drying 405. Further, it is also possible the no additional moisture is added, particularly in a case of the separate carrier 611, 611a, 611b.

Still further, in one embodiment, non-patterned adhesive coating comprising silicone additive is dried on a carrier before it is attached to the second side of the face.

Still further, in another embodiment, non-patterned adhesive coating comprising silicone additive is dried on the second side of the face.

In one preferred embodiment, the patterned, modified adhesive coating 120, comprising water-based acrylic adhesive and silicone additive is dried before it is attached to the second side 112 of the face or to the first side 111 of the face. If the adhesive coating is attached to the first side 111 of the face, it is applied onto a release coating 130, as discussed in this specification.

In another preferred embodiment, the patterned adhesive coating comprising silicone additive is dried on the second side of the face or on the first side of the face. If the adhesive coating is dried on the first side 111 of the face, the adhesive coating is dried on the release coating 130, as discussed in this specification.

Thanks to the present invention, many advantages may be obtained. For example, at least some of the following advantages may be obtained:
1) Reliable adhesion/tackiness of the adhesive may be obtained for all of those different types of surfaces onto which the label will be manually dispensed or applied, e.g. during the preparation of the order (for example in the kitchen) or when labelling the various items of the order (for example cups, boxes, wraps, bags or other packages).
2) Easy repositionability may be obtained so that the label is first applied onto a first surface and then repositioned onto another surface. For example, label may be used first in the kitchen as a note and then labelled onto the ready-made dish.
3) Easy removability may be obtained, for example for customers removing the label used as a closure or seal for a package.
4) Permanent final tack of the label may be achieved in applications where lower first tack is beneficial to reduce adhesive build up in the printer but permanent type of tack of label is preferred after dispensing on the item to be labelled.
5) Suitable chemistry either for direct or indirect food contact may be obtained.
6) Sustainability supporting the short life of such labels may be obtained, i.e. chemistry which does not create undue burden to the environment or call for any special waste management procedures compared to other waste that becomes generated in the processes and activities where such labels are used.
7) Water-based acrylic PSA together with silicone additive may provide further benefits, such as better sustainability with less fossil based raw materials and less volatiles involved both during the manufacturing and during end use.

EXPERIMENTAL TESTS

Example 1

Modified adhesive coatings were formed by mixing silicone emulsion to acrylic water-based adhesive. The adhesive coatings comprised emulsified silicone additive and water-based acrylic adhesive. The total amount of the silicone additive in the adhesive coatings varied between 0% and 6%, calculated from the total dry weight of the adhesive coating layer.

According to the test results, 1 wt. % emulsified silicone additive in the adhesive modified the adhesive performance. The best results were found when the amount of the emulsified silicone additive exceeded 2 wt. %. For cost reasons, the content of silicone was kept between 1 wt. % and 6 wt. %, i.e., the maximum amount of silicone was 6 wt. %.

According to the test results, the linerless label comprising the emulsified silicone additive had significantly better properties than same products without the emulsified silicone additive. Without the emulsified silicone additive, linerless label printer was able to cut the linerless label approximately 100 000 times (i.e., 100 000 cuts) before the printer needs a service. With the adhesive coating comprising acrylic water-based adhesive and emulsified silicone additive, the linerless label printer was able to cut the linerless label from 300 000 to 500 000 times, before the printer needed a service.

The amount of the cuts depended on the amount of silicone additive so that the best results were achieved when the amount of the silicone additive was between 2 wt. % and 6 wt. %, calculated from the total dry weight of the adhesive coating. Further, the label comprising the adhesive coating comprising the silicone additive was each time firmly attached to the surface of the labeled product.

This invention particularly relates to a linerless label to be cut by a blade of linerless label printer. With conventional linerless labels, adhesive has started soon to accumulate to a blade of the linerless label printer, resulting shorted printer service cycle. Sometimes, a linerless label having otherwise perfect adhesive may not be used at all because a printer service cycle would get too short. Thanks to the novel invention wherein the adhesive coating layer comprises water-based acrylic adhesive and emulsified silicone additive, adhesive accumulation to the blade of the printer may be significantly reduced. Further, adhesive accumulation to a platen roll and other parts of the linerless label printer may be significantly reduced. The effect of the novel solution can be improved by using adhesion-free areas on the second side of the face. Thanks to the novel solution, adhesives comprising water-based acrylic adhesive(s) and silicone additive can be used efficiently with direct thermal linerless label.

The silicone additive may be identified from the adhesive layer of the linerless label, e.g. by using FTIR laboratory device.

The invention is not limited solely to the examples presented in Figures and the above description, but it may be modified within the scope of the appended claims.

The invention claimed is:
1. A method for manufacturing a direct thermal linerless label web (100), the direct thermal linerless label web (100) comprising a face (110) having a first side (111) and a second side (112), the face comprising
    a direct thermal printable coating, and
    optionally, a release coating (130) on the direct thermal printable coating, wherein the method comprises
    supplying the face (110),
    applying a modified adhesive coating (121) on to a substrate (110, 611), the modified adhesive coating comprising
        a) water-based acrylic adhesive comprising 2-hydroxyethyl acrylate,
        b) emulsified silicone additive, the amount of the emulsified silicone additive being in a range between 1 wt. % and 6 wt. %, calculated from the total dry weight of the adhesive coating, and
        c) at least one wetting agent,
    and
    thermally drying the modified adhesive coating (121) on the substrate (110, 611) into a pressure sensitive adhesive coating (120),
wherein the pressure sensitive adhesive coating (120) comprising the silicone additive has a coat weight of 10 to equal to or less than 21 g/m$^2$, calculated as total dry weight of the pressure sensitive adhesive coating (120); wherein the emulsified silicone additive is present in an amount of 0.1 g/m$^2$ to 1.3 g/m$^2$, and wherein the wetting agent is present in an amount of 0.3 to 5 weight percent, calculated from a total dry weight of the pressure sensitive adhesive coating (120); wherein i) said substrate is the face (110), and the modified adhesive coating is applied on to
the first side (111) of the face (110), or
the second side (112) of the face (110)
or
ii) said substrate (110, 611) is a carrier material (611, 611a, 611b), and the method further comprises the following step:
transferring the pressure sensitive adhesive coating (120) from the carrier material on to
the first side (111) of the face (110), or
the second side (112) of the face (110).

2. The method according to claim 1, wherein
A)
   i) said substrate is the second side (112) of the face, or
   ii) said substrate is the carrier material and the pressure sensitive adhesive coating is transferred from the carrier material onto the second side (112) of the face,
   and
   iii) optionally, the face comprises the release coating (130) on the direct thermal printable coating,
or
B) the face comprises the release coating (130) on the direct thermal printable coating, and
   iv) said substrate is the first side (111) of the face, or
   v) said substrate is the carrier material and the pressure sensitive adhesive coating is transferred from the carrier material onto the first side (111) of the face.

3. The method according to claim 1, the method further comprising:
providing alternating adhesion areas and adhesion-free areas (150, 150a) before the modified adhesive coating (121) is dried into the pressure sensitive adhesive coating (120).

4. The method according to claim 3, wherein the method comprises:
removing at least 10% of the modified adhesive coating (121) from the substrate (110, 611) prior to drying to provide alternating adhesion areas and adhesion-free areas (150), preferably by using a wiping blade, wherein the blade is arranged at a wiping angle of 75-85 degrees with respect to the surface of the substrate (110, 611), or
applying the modified adhesive coating (121) locally onto the substrate to provide the alternating adhesion areas and adhesion-free areas (150, 150a).

5. The method according to claim 4, wherein said substrate is the face (110), and the method comprises
providing moisture to the adhesion-free areas (150, 150a) prior to drying of the modified adhesive coating (121),
wherein the moisture is provided by spraying water on the adhesion-free areas (150, 150a).

6. The method according to claim 3, wherein at least some of the modified adhesive coating (121) is removed from the substrate prior to drying, and
the adhesion-free areas (150, 150a) comprise a residual amount of the adhesive coating in a range of 0.5-5.0 g/m$^2$, and/or
a dry weight content of the modified adhesive coating after being removed from the substrate is 0.1-5% lower than a dry weight content of the adhesive coating (121) applied onto the substrate, and/or
a speed of the substrate is in a range between 100 m/min and 600 m/min, and a dwell time between applying the adhesive coating (121) and removing the adhesive coating is from 0.05 to 3 seconds.

7. The method according to claim 1, wherein
the modified adhesive coating (121) is dried at a temperature in a range between 60° C. and 100° C., and/or
temperature of the substrate when exiting thermal drying is arranged to be from 5 to 15 degrees C. below an activation temperature of the direct thermal printable coating.

8. The method according to claim 1, wherein the modified adhesive coating (121) is dried on the carrier material (611, 611a, 611b) into the pressure sensitive adhesive coating (120) before the adhesive is transferred on the face,
optionally, the modified adhesive coating (121) is dried at a temperature that is at least 10 degrees C. higher than the temperature of the linerless label web (100), and
the carrier material (611, 611a, 611b) is
   i) in a form of a reusable batch, or
   ii) an endless belt.

9. A direct thermal linerless label web (100) comprising a face (110) having a first side (111) and a second side (112), the face comprising
a direct thermal printable coating, and
optionally, a release coating (130) on the direct thermal printable coating, wherein the direct thermal linerless label web (100) is obtainable by a method comprising:
supplying the face (110),
applying a modified adhesive coating (121) on to a substrate (110, 611), the modified adhesive coating (121) comprising
a) water-based acrylic adhesive comprising 2-hydroxyethyl acrylate,
b) emulsified silicone additive, the amount of the emulsified silicone additive being in a range between 1 wt. % and 6 wt. %, calculated from the total dry weight of the modified adhesive coating (121), and
thermally drying the modified adhesive coating (121) on the substrate (110, 611) into a pressure sensitive adhesive coating (120),
wherein the pressure sensitive adhesive coating (120) comprising the silicone additive has a coat weight of 10 to equal to or less than 21 g/m$^2$, calculated as total dry weight of the pressure sensitive adhesive coating (120), wherein the emulsified silicone additive is present in an amount of 0.1 g/m$^2$ to 1.3 g/m$^2$, and wherein the pressure sensitive adhesive coating further comprises a wetting agent in an amount of 0.3 to 5 weight percent, calculated from a total dry weight of the pressure sensitive adhesive coating (120);
wherein
i) said substrate (110, 611) is the face (110), and the modified adhesive coating (121) is applied on to
the first side (111) of the face (110), or
the second side (112) of the face (110)
or
ii) said substrate (110, 611) is a carrier material (611, 611a, 611b), and the method further comprises the following step:
transferring the pressure sensitive adhesive coating (120) from the carrier material (611, 611a, 611b) on to
the first side (111) of the face (110), or
the second side (112) of the face (110).

10. The direct thermal linerless label web (100) according to claim 9, wherein
the direct thermal linerless label web (100) consists of
the face (110) comprising the direct thermal printable coating,
the pressure sensitive adhesive coating (120), and optionally, the release coating (130) on the direct thermal printable coating.

11. The direct thermal linerless label web (100) according to claim 9, wherein
the pressure sensitive adhesive coating (120) is arranged as continuous stripes, and/or
a total coverage of the pressure sensitive adhesive coating (120) is equal to or less than 90%, calculated from a total area of the second side (112), and/or
a total coverage of the pressure sensitive adhesive coating (120) is equal to or more than 10%, calculated from a total area of the second side (112).

12. The direct thermal linerless label web (100) according to claim 9, wherein
the pressure sensitive adhesive coating (120) comprising the silicone additive has a coat weight equal to or more than 15 g/m$^2$ to equal to or less than 21 g/m$^2$, calculated as total dry weight of the pressure sensitive adhesive coating (120).

13. A method of on-demand printing, the method comprising using a direct thermal linerless label (100) according to claim 9 in an on-demand printer.

14. A direct thermal linerless label web (100) comprising
1) A face (110) having a first side (111) and a second side (112), the face (110) comprising a direct thermal printable coating on the first side (111), and
2) Optionally, a release coating on the direct thermal printable coating, and
3) A pressure sensitive adhesive coating (120) on the second side (112) of the face (110),
wherein the pressure sensitive adhesive coating (120) comprises
dried water-based acrylic adhesive comprising 2-hydroxyethyl acrylate, and
an emulsified silicone additive, an amount of the emulsified silicone additive being in a range between 1 wt. % and 6 wt. %, calculated from a total dry weight of the pressure sensitive adhesive coating (120),
and wherein the pressure sensitive adhesive coating (120) comprising the emulsified silicone additive has a coat weight of 10 to equal to or less than 21 g/m$^2$, calculated as the total dry weight of the pressure sensitive adhesive coating (120),
wherein the emulsified silicone additive is present in an amount of 0.1 g/m$^2$ to 1.3 g/m$^2$, and
wherein the pressure sensitive adhesive coating further comprises a wetting agent in an amount of 0.3 to 5 weight percent, calculated from a total dry weight of the pressure sensitive adhesive coating (120).

15. The direct thermal linerless label web (100) according to claim 14, wherein
the direct thermal linerless label web (100) consists of
the face (110) comprising the direct thermal printable coating,
the pressure sensitive adhesive coating (120), and
optionally, the release coating (130) on the direct thermal printable coating.

16. The direct thermal linerless label web (100) according to claim 14, wherein
the pressure sensitive adhesive coating (120) is arranged as continuous stripes, and/or
a total coverage of the pressure sensitive adhesive coating (120) is equal to or less than 90%, calculated from a total area of the second side (112), and/or
a total coverage of the pressure sensitive adhesive coating (120) is equal to or more than 10%, calculated from a total area of the second side (112).

17. The direct thermal linerless label web (100) according to claim 14, wherein the pressure sensitive adhesive coating (120) comprising the silicone additive has a coat weight equal to or more than 15 g/m$^2$ to equal to or less than 21 g/m$^2$, calculated as total dry weight of the pressure sensitive adhesive coating (120).

* * * * *